US012630098B2

(12) United States Patent
Fredrickson et al.

(10) Patent No.: US 12,630,098 B2
(45) Date of Patent: May 19, 2026

(54) AUDIO SYSTEM FOR A UTILITY VEHICLE

(71) Applicant: Polaris Industries Inc., Medina, MN (US)

(72) Inventors: Donovan L. Fredrickson, Independence, MN (US); Jonathan M. Hetland, Little Canada, MN (US); Keith A. Hollman, Osceola, WI (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/436,074

(22) Filed: Feb. 8, 2024

(65) Prior Publication Data

US 2024/0174184 A1 May 30, 2024

Related U.S. Application Data

(63) Continuation of application No. 17/507,891, filed on Oct. 22, 2021, now Pat. No. 11,926,265, which is a
(Continued)

(51) Int. Cl.
| | |
|---|---|
| B60R 11/02 | (2006.01) |
| B60R 11/00 | (2006.01) |
(Continued)

(52) U.S. Cl.
CPC .......... B60R 11/0217 (2013.01); B62D 21/02 (2013.01); B62D 25/14 (2013.01);
(Continued)

(58) Field of Classification Search
CPC ......... B60R 11/0217; B60R 2011/0003; B60R 2011/0005; B60R 2011/0043;
(Continued)

(56) References Cited

U.S. PATENT DOCUMENTS

| | | | |
|---|---|---|---|
| 3,007,726 | A | 11/1961 | Parkin |
| 3,600,768 | A | 8/1971 | Romanzi et al. |
(Continued)

FOREIGN PATENT DOCUMENTS

| | | |
|---|---|---|
| CA | 2433019 A1 | 5/2003 |
| CA | 2903511 A1 | 12/2016 |
(Continued)

OTHER PUBLICATIONS

"2020 Polaris RZR—Is this the Real Deal?" Jul. 16, 2019. Youtube. https://www.youtube.com/watch?v=8J7uX6Y4UOc.
(Continued)

*Primary Examiner* — Paul Kim
*Assistant Examiner* — Douglas J Suthers
(74) *Attorney, Agent, or Firm* — SCHWEGMAN LUNDBERG & WOESSNER, P.A.

(57) ABSTRACT

An all-terrain or utility vehicle includes an audio system having at least one speaker. The at least one speaker is positioned at a forward portion of the operator area and is supported by a body panel. More particularly, the body panel may be configured to receive at least a portion of the speaker as well as at least a portion of an upper frame assembly. In this way, the speaker is positioned to direct sound towards the rider, is generally concealed from a front view of the vehicle, and is positioned within available space on the vehicle above at least a portion of the door.

16 Claims, 13 Drawing Sheets

Related U.S. Application Data continuation of application No. 16/522,957, filed on Jul. 26, 2019, now Pat. No. 11,260,803.

(51) Int. Cl.

| | |
|---|---|
| *B62D 21/02* | (2006.01) |
| *B62D 25/14* | (2006.01) |
| *B62D 63/04* | (2006.01) |
| *H04R 1/02* | (2006.01) |

(52) U.S. Cl.
CPC ............ *B62D 63/04* (2013.01); *H04R 1/025* (2013.01); *B60R 2011/0003* (2013.01); *B60R 2011/0005* (2013.01); *B60R 2011/0043* (2013.01); *H04R 2499/13* (2013.01)

(58) Field of Classification Search
CPC ........ B62D 21/02; B62D 25/14; B62D 63/04; H04R 1/025; H04R 2499/13
USPC ........................................................ 381/86
See application file for complete search history.

(56) References Cited

U.S. PATENT DOCUMENTS

| | | | |
|---|---|---|---|
| 3,734,219 A | 5/1973 | Christensen et al. | |
| 4,217,970 A | 8/1980 | Chika | |
| 4,429,588 A | 2/1984 | Emundts et al. | |
| 4,561,323 A | 12/1985 | Stromberg | |
| 4,577,716 A | 3/1986 | Norton | |
| 4,934,737 A | 6/1990 | Nakatsuka | |
| 4,967,944 A | 11/1990 | Waters | |
| 5,010,970 A | 4/1991 | Yamamoto | |
| 5,020,616 A | 6/1991 | Yagi et al. | |
| 5,021,721 A | 6/1991 | Oshita et al. | |
| 5,027,915 A | 7/1991 | Suzuki et al. | |
| 5,076,383 A | 12/1991 | Inoue et al. | |
| 5,078,225 A | 1/1992 | Ohmura et al. | |
| 5,083,827 A | 1/1992 | Hollenbaugh, Sr. | |
| 5,167,433 A | 12/1992 | Ryan | |
| 5,201,562 A | 4/1993 | Dorsey | |
| 5,205,371 A | 4/1993 | Karnopp | |
| 5,251,713 A | 10/1993 | Enokimoto | |
| 5,253,730 A | 10/1993 | Hayashi et al. | |
| 5,306,044 A | 4/1994 | Tucker | |
| 5,327,989 A | 7/1994 | Furuhashi et al. | |
| 5,473,990 A | 12/1995 | Anderson et al. | |
| 5,562,066 A | 10/1996 | Gere et al. | |
| 5,608,806 A * | 3/1997 | Hinojosa ................. | H04R 5/02 |
| | | | 381/86 |
| 5,653,304 A | 8/1997 | Renfroe | |
| 5,865,498 A | 2/1999 | Grogan | |
| 5,887,671 A | 3/1999 | Yuki et al. | |
| 5,921,343 A | 7/1999 | Yamakaji | |
| 6,067,078 A | 5/2000 | Hartman | |
| 6,086,158 A | 7/2000 | Zeoli | |
| 6,186,547 B1 | 2/2001 | Skabrond et al. | |
| 6,293,588 B1 | 9/2001 | Clune | |
| 6,309,024 B1 | 10/2001 | Busch | |
| 6,328,364 B1 | 12/2001 | Darbishire | |
| 6,467,787 B1 | 10/2002 | Marsh | |
| 6,502,886 B1 | 1/2003 | Bleau et al. | |
| 6,523,634 B1 | 2/2003 | Gagnon et al. | |
| 6,626,260 B2 | 9/2003 | Gagnon et al. | |
| 6,644,709 B2 | 11/2003 | Inagaki et al. | |
| 6,682,118 B2 | 1/2004 | Ryan | |
| 6,732,830 B2 | 5/2004 | Gagnon et al. | |
| 6,733,060 B1 | 5/2004 | Pavkov et al. | |
| 6,767,022 B1 | 7/2004 | Chevalier | |
| 6,799,779 B2 | 10/2004 | Shibayama | |
| 6,857,498 B2 | 2/2005 | Vitale et al. | |
| 6,880,875 B2 | 4/2005 | McClure et al. | |
| 6,883,851 B2 | 4/2005 | McClure et al. | |
| 6,895,318 B1 | 5/2005 | Barton et al. | |
| 6,966,399 B2 | 11/2005 | Tanigaki et al. | |

| | | |
|---|---|---|
| 7,000,931 B1 | 2/2006 | Chevalier |
| 7,077,233 B2 | 7/2006 | Hasegawa |
| 7,096,988 B2 | 8/2006 | Moriyama |
| 7,118,151 B2 | 10/2006 | Bejin et al. |
| 7,156,439 B2 | 1/2007 | Bejin et al. |
| 7,182,169 B2 | 2/2007 | Suzuki |
| 7,185,732 B2 | 3/2007 | Saito et al. |
| 7,216,733 B2 | 5/2007 | Iwami et al. |
| 7,234,707 B2 | 6/2007 | Green et al. |
| 7,344,156 B2 | 3/2008 | Suzuki et al. |
| 7,357,211 B2 | 4/2008 | Inui |
| 7,370,724 B2 | 5/2008 | Saito et al. |
| 7,374,012 B2 | 5/2008 | Inui et al. |
| 7,380,622 B2 | 6/2008 | Shimizu |
| 7,407,190 B2 | 8/2008 | Berg et al. |
| 7,458,593 B2 | 12/2008 | Saito et al. |
| 7,481,293 B2 | 1/2009 | Ogawa et al. |
| 7,490,694 B1 | 2/2009 | Berg et al. |
| 7,497,299 B2 | 3/2009 | Kobayashi |
| 7,497,471 B2 | 3/2009 | Kobayashi |
| 7,497,472 B2 | 3/2009 | Cymbal et al. |
| 7,503,610 B2 | 3/2009 | Karagitz et al. |
| 7,540,511 B2 | 6/2009 | Saito et al. |
| 7,565,944 B2 | 7/2009 | Sakamoto et al. |
| 7,565,945 B2 | 7/2009 | Okada et al. |
| 7,600,603 B2 | 10/2009 | Okada et al. |
| 7,604,084 B2 | 10/2009 | Okada et al. |
| 7,610,132 B2 | 10/2009 | Yanai et al. |
| 7,625,048 B2 | 12/2009 | Rouhana et al. |
| 7,630,807 B2 | 12/2009 | Yoshimura et al. |
| 7,740,103 B2 | 6/2010 | Sasajima |
| 7,786,886 B2 | 8/2010 | Maruyama et al. |
| 7,819,220 B2 | 10/2010 | Sunsdahl et al. |
| 7,832,770 B2 | 11/2010 | Bradley et al. |
| D633,006 S | 2/2011 | Sanschagrin et al. |
| 7,950,486 B2 | 5/2011 | Van et al. |
| 7,954,679 B2 | 6/2011 | Edwards |
| 8,027,775 B2 | 9/2011 | Takenaka et al. |
| 8,056,966 B2 | 11/2011 | Edwards et al. |
| 8,079,602 B2 | 12/2011 | Kinsman et al. |
| 8,104,524 B2 | 1/2012 | Manesh et al. |
| 8,176,957 B2 | 5/2012 | Manesh et al. |
| 8,215,694 B2 | 7/2012 | Smith et al. |
| 8,231,164 B2 | 7/2012 | Schubring et al. |
| 8,271,175 B2 | 9/2012 | Takenaka et al. |
| 8,302,711 B2 | 11/2012 | Kinsman et al. |
| 8,328,235 B2 | 12/2012 | Schneider et al. |
| 8,382,125 B2 | 2/2013 | Sunsdahl et al. |
| 8,464,824 B1 | 6/2013 | Reisenberger |
| 8,465,050 B1 | 6/2013 | Spindler et al. |
| 8,538,628 B2 | 9/2013 | Backman |
| 8,548,710 B1 | 10/2013 | Reisenberger |
| 8,596,405 B2 | 12/2013 | Sunsdahl et al. |
| 8,613,335 B2 | 12/2013 | Deckard et al. |
| 8,613,337 B2 | 12/2013 | Kinsman et al. |
| 8,640,814 B2 | 2/2014 | Deckard et al. |
| 8,781,705 B1 | 7/2014 | Reisenberger |
| D711,778 S | 8/2014 | Chun et al. |
| D712,309 S | 9/2014 | Wu et al. |
| 8,827,025 B2 | 9/2014 | Hapka |
| 8,827,028 B2 | 9/2014 | Sunsdahl et al. |
| 8,997,908 B2 | 4/2015 | Kinsman et al. |
| 8,998,253 B2 | 4/2015 | Novotny et al. |
| 9,010,768 B2 | 4/2015 | Kinsman et al. |
| D730,239 S | 5/2015 | Gonzalez |
| 9,150,182 B1 | 10/2015 | Schlangen et al. |
| D756,845 S | 5/2016 | Flores |
| D764,974 S | 8/2016 | Mikhailov et al. |
| 9,434,244 B2 | 9/2016 | Sunsdahl et al. |
| 9,440,671 B2 | 9/2016 | Schlangen et al. |
| 9,469,329 B1 | 10/2016 | Leanza |
| D772,755 S | 11/2016 | Tandrup et al. |
| 9,540,052 B2 | 1/2017 | Burt, II et al. |
| 9,573,561 B2 | 2/2017 | Muto et al. |
| D780,627 S | 3/2017 | Jhant et al. |
| 9,592,713 B2 | 3/2017 | Kinsman et al. |
| D784,200 S | 4/2017 | Dunshee et al. |
| 9,623,912 B2 | 4/2017 | Schlangen |
| D785,502 S | 5/2017 | Dunshee et al. |

(56) References Cited

U.S. PATENT DOCUMENTS

| | | | |
|---|---|---|---|
| 9,649,928 | B2 | 5/2017 | Danielson et al. |
| 9,713,976 | B2 | 7/2017 | Miller et al. |
| 9,725,023 | B2 | 8/2017 | Miller et al. |
| 9,776,481 | B2 | 10/2017 | Deckard et al. |
| 9,789,909 | B2 | 10/2017 | Erspamer et al. |
| 9,809,102 | B2 | 11/2017 | Sunsdahl et al. |
| 9,895,946 | B2 | 2/2018 | Schlangen et al. |
| 9,994,130 | B2 | 6/2018 | Michels et al. |
| 10,011,189 | B2 | 7/2018 | Sunsdahl et al. |
| 10,017,090 | B2 | 7/2018 | Franker et al. |
| 10,112,555 | B2 | 10/2018 | Aguilera et al. |
| 10,124,709 | B2 | 11/2018 | Bohnsack et al. |
| 10,154,377 | B2 | 12/2018 | Post et al. |
| 10,183,596 | B2 | 1/2019 | Watanabe et al. |
| 10,183,605 | B2 | 1/2019 | Weber et al. |
| 10,246,153 | B2 | 4/2019 | Deckard et al. |
| 10,369,861 | B2 | 8/2019 | Deckard et al. |
| 10,399,401 | B2 | 9/2019 | Schlangen et al. |
| 10,486,748 | B2 | 11/2019 | Deckard et al. |
| 10,526,079 | B1 | 1/2020 | Reichert et al. |
| 10,596,924 | B2 | 3/2020 | Sprenger |
| D890,026 | S | 7/2020 | Nightingale et al. |
| 10,864,828 | B2 | 12/2020 | Inc. |
| D906,888 | S | 1/2021 | Satulovsky |
| 10,926,618 | B2 | 2/2021 | Deckard et al. |
| 10,926,664 | B2 | 2/2021 | Sunsdahl et al. |
| 10,960,941 | B2 | 3/2021 | Endrizzi et al. |
| 11,260,803 | B2 | 3/2022 | Fredrickson et al. |
| 11,299,071 | B2 | 4/2022 | Gropp et al. |
| 11,572,110 | B2 | 2/2023 | Levin et al. |
| 11,926,265 | B2 | 3/2024 | Fredrickson et al. |
| 2001/0021887 | A1 | 9/2001 | Obradovich et al. |
| 2001/0035642 | A1 | 11/2001 | Gotz et al. |
| 2001/0041126 | A1 | 11/2001 | Morin et al. |
| 2002/0082752 | A1 | 6/2002 | Obradovich |
| 2002/0135175 | A1 | 9/2002 | Schroth |
| 2003/0015531 | A1 | 1/2003 | Choi |
| 2003/0057724 | A1 | 3/2003 | Inagaki et al. |
| 2003/0132075 | A1 | 7/2003 | Drivers |
| 2003/0205867 | A1 | 11/2003 | Coelingh et al. |
| 2004/0010383 | A1 | 1/2004 | Lu et al. |
| 2004/0041358 | A1 | 3/2004 | Hrovat et al. |
| 2004/0066091 | A1 | 4/2004 | King |
| 2004/0079561 | A1 | 4/2004 | Ozawa et al. |
| 2004/0107591 | A1 | 6/2004 | Cuddy |
| 2004/0108159 | A1 | 6/2004 | Rondeau et al. |
| 2004/0169347 | A1 | 9/2004 | Seki |
| 2004/0195019 | A1 | 10/2004 | Kato et al. |
| 2004/0221669 | A1 | 11/2004 | Shimizu et al. |
| 2004/0226384 | A1 | 11/2004 | Shimizu et al. |
| 2004/0231900 | A1 | 11/2004 | Tanaka et al. |
| 2005/0012421 | A1 | 1/2005 | Fukuda et al. |
| 2005/0045414 | A1 | 3/2005 | Takagi et al. |
| 2005/0073187 | A1 | 4/2005 | Frank et al. |
| 2005/0131604 | A1 | 6/2005 | Lu |
| 2005/0231145 | A1 | 10/2005 | Mukai et al. |
| 2005/0235767 | A1 | 10/2005 | Shimizu et al. |
| 2005/0235768 | A1 | 10/2005 | Shimizu et al. |
| 2005/0242677 | A1 | 11/2005 | Akutsu et al. |
| 2005/0248173 | A1 | 11/2005 | Bejin et al. |
| 2005/0257989 | A1 | 11/2005 | Iwami et al. |
| 2005/0257990 | A1 | 11/2005 | Shimizu |
| 2005/0267660 | A1 | 12/2005 | Fujiwara et al. |
| 2006/0017301 | A1 | 1/2006 | Edwards |
| 2006/0022619 | A1 | 2/2006 | Koike et al. |
| 2006/0042862 | A1 | 3/2006 | Saito et al. |
| 2006/0050915 | A1* | 3/2006 | Velican .................... H04R 3/04 |
| | | | 381/349 |
| 2006/0055139 | A1 | 3/2006 | Furumi et al. |
| 2006/0061117 | A1 | 3/2006 | Lester et al. |
| 2006/0065472 | A1 | 3/2006 | Ogawa et al. |
| 2006/0075840 | A1 | 4/2006 | Saito et al. |
| 2006/0076180 | A1 | 4/2006 | Saito et al. |
| 2006/0108174 | A1 | 5/2006 | Saito et al. |
| 2006/0131088 | A1 | 6/2006 | Pawusch et al. |
| 2006/0131865 | A1 | 6/2006 | Wasek et al. |
| 2006/0154762 | A1 | 7/2006 | Brown |
| 2006/0162990 | A1 | 7/2006 | Saito et al. |
| 2006/0169525 | A1 | 8/2006 | Saito et al. |
| 2006/0175124 | A1 | 8/2006 | Saito et al. |
| 2006/0180385 | A1 | 8/2006 | Yanai et al. |
| 2006/0181104 | A1 | 8/2006 | Khan et al. |
| 2006/0185741 | A1 | 8/2006 | McKee |
| 2006/0185927 | A1 | 8/2006 | Sakamoto et al. |
| 2006/0191734 | A1 | 8/2006 | Kobayashi |
| 2006/0191735 | A1 | 8/2006 | Kobayashi |
| 2006/0191737 | A1 | 8/2006 | Kobayashi |
| 2006/0191739 | A1 | 8/2006 | Koga |
| 2006/0196721 | A1 | 9/2006 | Saito et al. |
| 2006/0196722 | A1 | 9/2006 | Makabe et al. |
| 2006/0201270 | A1 | 9/2006 | Kobayashi |
| 2006/0207823 | A1 | 9/2006 | Okada et al. |
| 2006/0207824 | A1 | 9/2006 | Saito et al. |
| 2006/0207825 | A1 | 9/2006 | Okada et al. |
| 2006/0208564 | A1 | 9/2006 | Yuda et al. |
| 2006/0212200 | A1 | 9/2006 | Yanai et al. |
| 2006/0219463 | A1 | 10/2006 | Seki et al. |
| 2006/0219469 | A1 | 10/2006 | Okada et al. |
| 2006/0219470 | A1 | 10/2006 | Imagawa et al. |
| 2006/0255610 | A1 | 11/2006 | Bejin et al. |
| 2006/0288800 | A1 | 12/2006 | Mukai et al. |
| 2007/0013181 | A1 | 1/2007 | Heck |
| 2007/0023566 | A1 | 2/2007 | Howard |
| 2007/0068726 | A1 | 3/2007 | Shimizu |
| 2007/0074588 | A1 | 4/2007 | Harata et al. |
| 2007/0074589 | A1 | 4/2007 | Harata et al. |
| 2007/0074927 | A1 | 4/2007 | Okada et al. |
| 2007/0074928 | A1 | 4/2007 | Okada et al. |
| 2007/0095601 | A1 | 5/2007 | Okada et al. |
| 2007/0096449 | A1 | 5/2007 | Okada et al. |
| 2007/0175696 | A1 | 8/2007 | Saito et al. |
| 2007/0242398 | A1 | 10/2007 | Ogawa |
| 2007/0261904 | A1 | 11/2007 | Fecteau et al. |
| 2008/0023240 | A1 | 1/2008 | Sunsdahl et al. |
| 2008/0023249 | A1 | 1/2008 | Sunsdahl et al. |
| 2008/0053743 | A1 | 3/2008 | Tomita |
| 2008/0059034 | A1 | 3/2008 | Lu |
| 2008/0106115 | A1* | 5/2008 | Hughes ................ B62D 29/043 |
| | | | 296/102 |
| 2008/0143505 | A1 | 6/2008 | Maruyama et al. |
| 2008/0172155 | A1 | 7/2008 | Takamatsu et al. |
| 2008/0183353 | A1 | 7/2008 | Post et al. |
| 2008/0199253 | A1 | 8/2008 | Okada et al. |
| 2008/0296884 | A1 | 12/2008 | Rouhana et al. |
| 2009/0065285 | A1 | 3/2009 | Maeda et al. |
| 2009/0078491 | A1 | 3/2009 | Tsutsumikoshi et al. |
| 2009/0093928 | A1 | 4/2009 | Getman et al. |
| 2009/0108617 | A1 | 4/2009 | Songwe, Jr. |
| 2009/0152035 | A1 | 6/2009 | Okada et al. |
| 2009/0152036 | A1 | 6/2009 | Okada et al. |
| 2009/0178871 | A1 | 7/2009 | Sunsdahl et al. |
| 2009/0184531 | A1* | 7/2009 | Yamamura ............. B62D 33/02 |
| | | | 296/65.01 |
| 2009/0189373 | A1 | 7/2009 | Schramm et al. |
| 2009/0301830 | A1* | 12/2009 | Kinsman ............... F16F 9/0218 |
| | | | 188/289 |
| 2009/0302590 | A1 | 12/2009 | Van et al. |
| 2010/0017059 | A1 | 1/2010 | Lu et al. |
| 2010/0090797 | A1 | 4/2010 | Koenig et al. |
| 2010/0194086 | A1 | 8/2010 | Yamamura et al. |
| 2010/0211261 | A1 | 8/2010 | Sasaki et al. |
| 2010/0314191 | A1 | 12/2010 | Deckard et al. |
| 2011/0035089 | A1 | 2/2011 | Hirao et al. |
| 2011/0279282 | A1 | 11/2011 | Bryant |
| 2011/0297462 | A1 | 12/2011 | Grajkowski et al. |
| 2011/0298189 | A1 | 12/2011 | Schneider et al. |
| 2011/0304114 | A1 | 12/2011 | Spanjers |
| 2011/0309118 | A1 | 12/2011 | Wada |
| 2012/0029770 | A1 | 2/2012 | Hirao et al. |
| 2012/0078470 | A1 | 3/2012 | Hirao et al. |
| 2012/0085588 | A1 | 4/2012 | Kinsman et al. |
| 2012/0193163 | A1 | 8/2012 | Wimpfheimer et al. |
| 2012/0223500 | A1 | 9/2012 | Kinsman et al. |
| 2012/0247888 | A1 | 10/2012 | Chikuma et al. |

(56) References Cited

U.S. PATENT DOCUMENTS

| | | |
|---|---|---|
| 2013/0033070 A1 | 2/2013 | Kinsman et al. |
| 2013/0041545 A1 | 2/2013 | Baer et al. |
| 2013/0079988 A1 | 3/2013 | Hirao et al. |
| 2013/0199097 A1 | 8/2013 | Spindler et al. |
| 2013/0319785 A1 | 12/2013 | Spindler et al. |
| 2013/0338869 A1 | 12/2013 | Tsumano |
| 2014/0103627 A1 | 4/2014 | Deckard et al. |
| 2014/0294195 A1 | 10/2014 | Perez et al. |
| 2014/0358373 A1 | 12/2014 | Kikuchi et al. |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0057885 A1 | 2/2015 | Brady et al. |
| 2015/0061275 A1 | 3/2015 | Deckard et al. |
| 2015/0078580 A1 | 3/2015 | Schwerdtfeger et al. |
| 2015/0210137 A1 | 7/2015 | Kinsman et al. |
| 2015/0259011 A1 | 9/2015 | Deckard et al. |
| 2016/0059660 A1 | 3/2016 | Brady et al. |
| 2016/0332553 A1 | 11/2016 | Miller et al. |
| 2016/0332676 A1 | 11/2016 | Miller et al. |
| 2017/0013336 A1 | 1/2017 | Stys et al. |
| 2017/0120946 A1 | 5/2017 | Gong et al. |
| 2017/0131095 A1 | 5/2017 | Kim |
| 2017/0199094 A1 | 7/2017 | Duff et al. |
| 2017/0334500 A1 | 11/2017 | Jarek et al. |
| 2018/0007466 A1 | 1/2018 | Hess et al. |
| 2018/0022391 A1 | 1/2018 | Erspamer et al. |
| 2018/0065465 A1 | 3/2018 | Ward et al. |
| 2018/0328321 A1 | 11/2018 | Toda et al. |
| 2019/0110161 A1 | 4/2019 | Rentz et al. |
| 2019/0143871 A1 | 5/2019 | Weber et al. |
| 2019/0193501 A1 | 6/2019 | Brady et al. |
| 2019/0210668 A1 | 7/2019 | Endrizzi et al. |
| 2019/0215606 A1 | 7/2019 | You et al. |
| 2019/0217909 A1 | 7/2019 | Deckard et al. |
| 2019/0256010 A1 | 8/2019 | Baba et al. |
| 2019/0265064 A1 | 8/2019 | Koenig et al. |
| 2019/0306599 A1 | 10/2019 | Nagai et al. |
| 2020/0001673 A1 | 1/2020 | Schlangen et al. |
| 2020/0070709 A1 | 3/2020 | Weber et al. |
| 2020/0122776 A1 | 4/2020 | Schlangen et al. |
| 2020/0262285 A1 | 8/2020 | Sunsdahl et al. |
| 2020/0363054 A1 | 11/2020 | Wilson et al. |
| 2021/0024007 A1 | 1/2021 | Fredrickson et al. |
| 2021/0206438 A1 | 7/2021 | Levin et al. |
| 2022/0041115 A1 | 2/2022 | Fredrickson et al. |
| 2023/0150588 A1 | 5/2023 | Deckard et al. |
| 2024/0157898 A1 | 5/2024 | Wuollet et al. |

FOREIGN PATENT DOCUMENTS

| | | |
|---|---|---|
| CN | 1572577 | 2/2005 |
| CN | 1646359 A | 7/2005 |
| CN | 201007087 Y | 1/2008 |
| CN | 202986930 U | 6/2013 |
| CN | 104442637 A | 3/2015 |
| CN | 104564935 A | 4/2015 |
| CN | 104661903 A | 5/2015 |
| CN | 104703866 A | 6/2015 |
| CN | 204437029 U | 7/2015 |
| CN | 204511639 U | 7/2015 |
| CN | 105730221 A | 7/2016 |
| CN | 105835787 | 8/2016 |
| CN | 205589125 | 9/2016 |
| CN | 107251577 A | 10/2017 |
| CN | 107635800 A | 1/2018 |
| CN | 108859990 A | 11/2018 |
| DE | 2752798 A1 | 6/1978 |
| DE | 3007726 A1 | 9/1981 |
| DE | 102004049557 A1 | 4/2006 |
| DE | 102010020544 A1 | 1/2011 |
| EP | 0697306 A1 | 2/1996 |
| EP | 1548298 A2 | 6/2005 |
| FR | 2907410 A1 | 4/2008 |
| GB | 2316923 A | 3/1998 |

| | | |
|---|---|---|
| JP | 53-101625 A | 9/1978 |
| JP | 2000-025494 A | 1/2000 |
| JP | 2005-193788 A | 7/2005 |
| JP | 2006-232058 A | 9/2006 |
| JP | 2006-232061 A | 9/2006 |
| JP | 2006-256579 A | 9/2006 |
| JP | 2006-256580 A | 9/2006 |
| JP | 2006-281839 A | 10/2006 |
| JP | 2007-106319 A | 4/2007 |
| JP | 2010-095106 A | 4/2010 |
| WO | 84/00524 A1 | 2/1984 |
| WO | 03/41446 A2 | 5/2003 |
| WO | 03/70543 A1 | 8/2003 |
| WO | 2009/096998 A1 | 8/2009 |
| WO | 2013/047741 A1 | 4/2013 |
| WO | 2014/039432 A2 | 3/2014 |
| WO | 2014/039433 A2 | 3/2014 |
| WO | 2014/047488 A1 | 3/2014 |
| WO | 2014/059258 A1 | 4/2014 |
| WO | 2017/187413 A1 | 11/2017 |
| WO | 2019/140026 A1 | 7/2019 |

OTHER PUBLICATIONS

"Evolution of the RZR: Which One is the Best?" Aug. 23, 2018. Youtube. https://www.youtube.com/watch?v=QE6VyxWxoow.

Polaris RZR XP4 1000 Launch Video- Polaris RZR Sport Side by Side ATV. Apr. 25, 2014. Youtube, https://www.youtube.com/watch?v=roncbPaRIMU.

2009 Honda Big Red, ATV Illustrated at http://www.atvillustrated.com/?q=node/6615/20/2008, 6 pgs.

2016 MUDPRO 700 Limited, Artic Cat, http://www.articcat.com/dirt/atvs/model/2016-en-mudpro-700-limited/, copyright 2015, 23 pages.

All-Terrain Vehicles. Design—(Copyrights) Questel) orbit.com. [Online PDF compilation of references selected by examiner] 72 pgs. Print Dates Range Aug. 7, 2020—Mar. 18, 2019 [Retrieved Jun. 25, 2021].

Arctic Cat, company website, Prowler XT 650 H1, undated, 9 pgs.

BRP Can-Am Commander photo, undated; 1 page.

Buyer's Guide Supplement, 2006 Kart Guide, Powersports Business Magazine; 6 pages.

Club Car, Company Website, product pages for XRT 1500 SE, undated; 2 pages.

Duneguide.com, "Product Review 2009 Honda Big Red MUV," retrieved from http:www.duneguide.com/ProductReview.sub.--Honda.sub.--BigRed.htm, May 20, 2008, 3 pgs.

High-Performance "Truck Steering" Automotive Engineering, Society of Automotive Engineers. Warrendale, US, vol. 98. No. 4, Apr. 1, 1990, pp. 56-60.

Honda Hippo 1800 New Competition for Yamaha's Rhino, Dirt Wheels Magazine, Apr. 2006, pp. 91-92.

International Preliminary Report on Patentability issued by The International Bureau of WIPO, dated Apr. 14, 2015, for International Patent Application No. PCT/US2013/064516; 18 pages.

International Preliminary Report on Patentability issued by The International Bureau of WIPO, dated Jul. 14, 2020, for International Patent Application No. PCT/US2019/012958; 19 pages.

International Preliminary Report on Patentability received for PCT Patent Application No. PCT/US2020/042787, mailed on Jun. 24, 2021, 17 pages.

International Search Report and Written Opinion issued by the European Patent Office, dated Jan. 14, 2014, for International Patent Application No. PCT/US2013/064516; 24 pages.

International Search Report and Written Opinion issued by the International Searching Authority, dated Oct. 21, 2020, for International Patent Application No. PCT/US2020/42787; 18 pages.

International Search Report and Written Opinion received for PCT Patent Application No. PCT/US2019/012958, mailed on Jul. 3, 2019, 27 pages.

Kawasaki Mule The Off-Road Capable 610 4 .times. 4 XC Brochure 2011, .COPYRGT. 2010, 6 pages.

Kawasaki Mule Utility Vehicle Brochure 2009, .COPYRGT. 2008; 10 pages.

(56) References Cited

OTHER PUBLICATIONS

Kawasaki Teryx 750 F1 4 ×4 Sport Brochure 2011, (Copyrights) 2010; 6 pages.

Mtx (Imtx Audio Thunder Sports RZRPod65-owners-manual, 2016); 8 pages.

Office Action issued by the Chinese Patent Office, dated Jun. 9, 2021, for Chinese Patent Application No. 201980007897.1; 6 pages (3 pages of English Translation and 3 pages of Original Document).

Outlander X mr 850, available at https://can-am.brp.com/off-road/atv/outlander/outlander-x-mr-850.html; .COPYRGT. 2003-2017; 3 pages.

Patent Examination Report issued by the Australian Government IP Australia, dated Apr. 7, 2016, for Australian Patent Application No. 2013329090; 3 pages.

Polaris Ranger Brochure 2009, copyright 2008; 32 pages.

Polaris Ranger Brochure ATVs and Side .times. Sides Brochure 2010, .COPYRGT. 2009, 26 pages.

Polaris Ranger Off-Road Utility Vehicles Brochure 2004, .COPYRGT. 2003; 20 pages.

Polaris Ranger RZR Brochure 2011, .COPYRGT. 2010; 16 pages.

Polaris Ranger Welcome to Ranger Country Brochure 2006, .COPYRGT. 2005, 24 pages.

Polaris Ranger Work/Play Only Brochure 2008, .COPYRGT. 2007, 28 pages.

Ray Sedorchuk, New for 2004, Yamaha Rhino 660 4 ×4, ATV Connection Magazine, (Copyrights) 2006; 3 pages.

Redline Specs, copyright 2008, available at www.RedlinePerforms. com., 2 pages.

Renegade X MR 1000R, Can-Am, http://can-am.brp.com/off-road/atv/renegade/renegade-x-mr-1000R.html, copyright 2003-2015, 12 pages.

Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 p.

Welcome to Ranger Country brochure, .COPYRGT. 2005, Polaris Industries Inc., 24 pgs.

Work/Play Only Ranger brochure, .COPYRGT. 2007, Polaris Industries Inc., 28 pgs.

Yamaha, Company Website, 2006 Rhino 450 Auto 4 .times. 4, .COPYRGT. 2005, 3 pages.

Yamaha, Company Website, Rhino 660 Auto 4 ×4 Exploring Edition Specifications, (Copyrights) 2006; 3 pages.

"Chinese Application Serial No. 202310510013.2, Office Action mailed Apr. 26, 2025", With English Translation, 14 pgs.

"U.S. Appl. No. 16/522,957, Preliminary Amendment filed Jan. 3, 2020", 3 pgs.

"U.S. Appl. No. 16/522,957, Non Final Office Action mailed Apr. 24, 2020", 10 pgs.

"U.S. Appl. No. 16/522,957, Response filed Jul. 23, 20 to Non Final Office Action mailed Apr. 24, 2020", 8 pgs.

"U.S. Appl. No. 16/522,957, Final Office Action mailed Oct. 27, 2020", 14 pgs.

"U.S. Appl. No. 16/522,957, Response filed Dec. 10, 2020 to Final Office Action mailed Oct. 27, 2020", 11 pgs.

"U.S. Appl. No. 16/522,957, Advisory Action mailed Dec. 17, 2020", 3 pgs.

"U.S. Appl. No. 16/522,957, Non Final Office Action mailed Mar. 31, 2021", 22 pgs.

"U.S. Appl. No. 16/522,957, Examiner Interview Summary mailed May 7, 2021", 3 pgs.

"U.S. Appl. No. 16/522,957, Response filed May 10, 2021 to Non Final Office Action mailed Mar. 31, 2021", 10 pgs.

"U.S. Appl. No. 16/522,957, Final Office Action mailed Aug. 18, 2021", 11 pgs.

"U.S. Appl. No. 16/522,957, Response filed Oct. 7, 2021 to Final Office Action mailed Aug. 18, 2021", 9 pgs.

"U.S. Appl. No. 16/522,957, Examiner Interview Summary mailed Oct. 12, 2021", 3 pgs.

"U.S. Appl. No. 16/522,957, Notice of Allowance mailed Oct. 27, 2021", 10 pgs.

"U.S. Appl. No. 17/507,891, Non Final Office Action mailed Jul. 22, 2022", 14 pgs.

"U.S. Appl. No. 17/507,891, Response filed Oct. 24, 2022 to Non Final Office Action mailed Jul. 22, 2022", 8 pgs.

"U.S. Appl. No. 17/507,891, Final Office Action mailed Feb. 16, 2023", 18 pgs.

"U.S. Appl. No. 17/507,891, Response filed Apr. 28, 2023 to Final Office Action mailed Feb. 16, 2023", 6 pgs.

"U.S. Appl. No. 17/507,891, Advisory Action mailed May 9, 2023", 3 pgs.

"U.S. Appl. No. 17/507,891, Examiner Interview Summary mailed May 22, 2023", 3 pgs.

"U.S. Appl. No. 17/507,891, Non Final Office Action mailed Jun. 8, 2023", 19 pgs.

"U.S. Appl. No. 17/507,891, Response filed Sep. 7, 2023 to Non Final Office Action mailed Jun. 8, 2023", 6 pgs.

"U.S. Appl. No. 17/507,891, Notice of Allowance mailed Nov. 6, 2023", 10 pgs.

"U.S. Appl. No. 17/507,891, Response filed May 16, 2023 to Advisory Action mailed May 9, 2023", 7 pgs.

"Mexican Application Serial No. MX a 2022 001024, Office Action mailed May 21, 2025", With English Machine Translation, 10 pgs.

"Mexican Application Serial No. MX a 2022 001024, Response filed Aug. 1, 2025 to Office Action mailed May 21, 2025", w English claims, 13 pgs.

"Chinese Application Serial No. 202310510013.2, Response filed Aug. 26, 2025 to Office Action mailed Apr. 26, 2025", w English Claims, 18 pgs.

"Chinese Application Serial No. 202310510013.2, Office Action mailed Oct. 15, 2025", With English Machine Translation, 17 pgs.

"Chinese Application Serial No. 202310510013.2, Response filed Dec. 15, 2025 to Office Action mailed Oct. 15, 2025", w/ English Claims, 18 pgs.

* cited by examiner

AUDIO SYSTEM FOR A UTILITY VEHICLE

CROSS-REFERENCE TO RELATED APPLICATIONS

The present application is a continuation of U.S. patent application Ser. No. 17/507,891, filed Oct. 22, 2021, which is a continuation of U.S. patent application Ser. No. 16/522, 957, filed Jul. 26, 2019, titled AUDIO SYSTEM FOR A UTILITY VEHICLE, the complete disclosures of which are expressly incorporated by reference herein.

The present application is related to U.S. patent application Ser. No. 16/244,462, filed Jan. 10, 2019, and entitled "VEHICLE" and U.S. Provisional Patent Application Ser. No. 62/840,654, filed Apr. 30, 2019, and entitled "VEHICLE", the complete disclosures of which are expressly incorporated by reference herein.

FIELD OF THE DISCLOSURE

The present invention relates generally to an audio system for a vehicle and, in particular, to the location and mounting of speakers and audio components on all-terrain or utility vehicle.

BACKGROUND OF THE DISCLOSURE

Some vehicles such as utility vehicles, all-terrain vehicles, tractors, and others include infotainment options for the rider, which allow the rider to listen to music, use Bluetooth connectivity for cellular devices, engage in intervehicle communications, review and select operating conditions for the vehicle, etc. To allow for these options, such vehicles include an audio systems with at least one speaker.

However, there can be challenges to finding available space in the vehicle cabin for speakers. As such, it is known that speakers may be positioned near various body panels or other surfaces that can negatively impact or divert the sound away from the rider. For example, the speaker(s) may be positioned in the door or kick panel of a vehicle such that the speaker(s) does not focus or direct sound toward the rider's ears/head. Further, aesthetically, it may be desirable to allow the speaker and/or other components of the audio system to blend in with various body panels or frame members of the vehicle. As such, there is a need for an audio system for an all-terrain or utility vehicle which provides appropriate sound quality to the rider and utilizes available space on the vehicle.

SUMMARY OF THE DISCLOSURE

In one embodiment of the present disclosure, a utility vehicle comprises a frame assembly having an upper frame assembly and a lower frame assembly coupled to each other at a coupling location; a body assembly supported by the frame assembly and including a dashboard assembly; and an open-air operator area positioned generally below an upper extent of the upper frame assembly and rearward of the coupling location. The utility vehicle also comprises an audio system configured to project sound within the operator area. The audio system includes at least one speaker positioned above the dashboard assembly.

In another embodiment of the present disclosure, a utility vehicle comprises a frame assembly having an upper frame assembly and a lower frame assembly coupled to each other at a coupling location; a body assembly including at least a hood and a door and supported by the frame assembly; and an operator area positioned generally below an upper extent of the upper frame assembly and rearward of the coupling location. The utility vehicle also comprises an audio system configured to project sound within the operator area. The audio system includes at least one speaker positioned above a portion of the door.

In a further embodiment of the present disclosure, a utility vehicle comprises a frame assembly including a lower frame assembly and an upper frame assembly. The upper frame assembly is coupled to the lower frame assembly at a first connection location. The utility vehicle also comprises a body assembly supported by the frame assembly and comprising a plurality of body panels. Additionally, the utility vehicle comprises an operator area defined by the upper and lower frame assemblies which includes seating configured to support at least an operator of the utility vehicle. The utility vehicle also comprises an audio system configured to project sound within the operator area. At least one of the plurality of body panels is configured to support a portion of the audio system and a portion of the frame assembly. The at least one of the plurality of body panels is further configured to conceal the first connection location.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members and a continuously variable transmission, including, but not limited to, all-terrain vehicles, motorcycles, snowmobiles, scooters, three-wheeled vehicles, and golf carts.

Referring to FIGS. 1-7, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Figure 1:
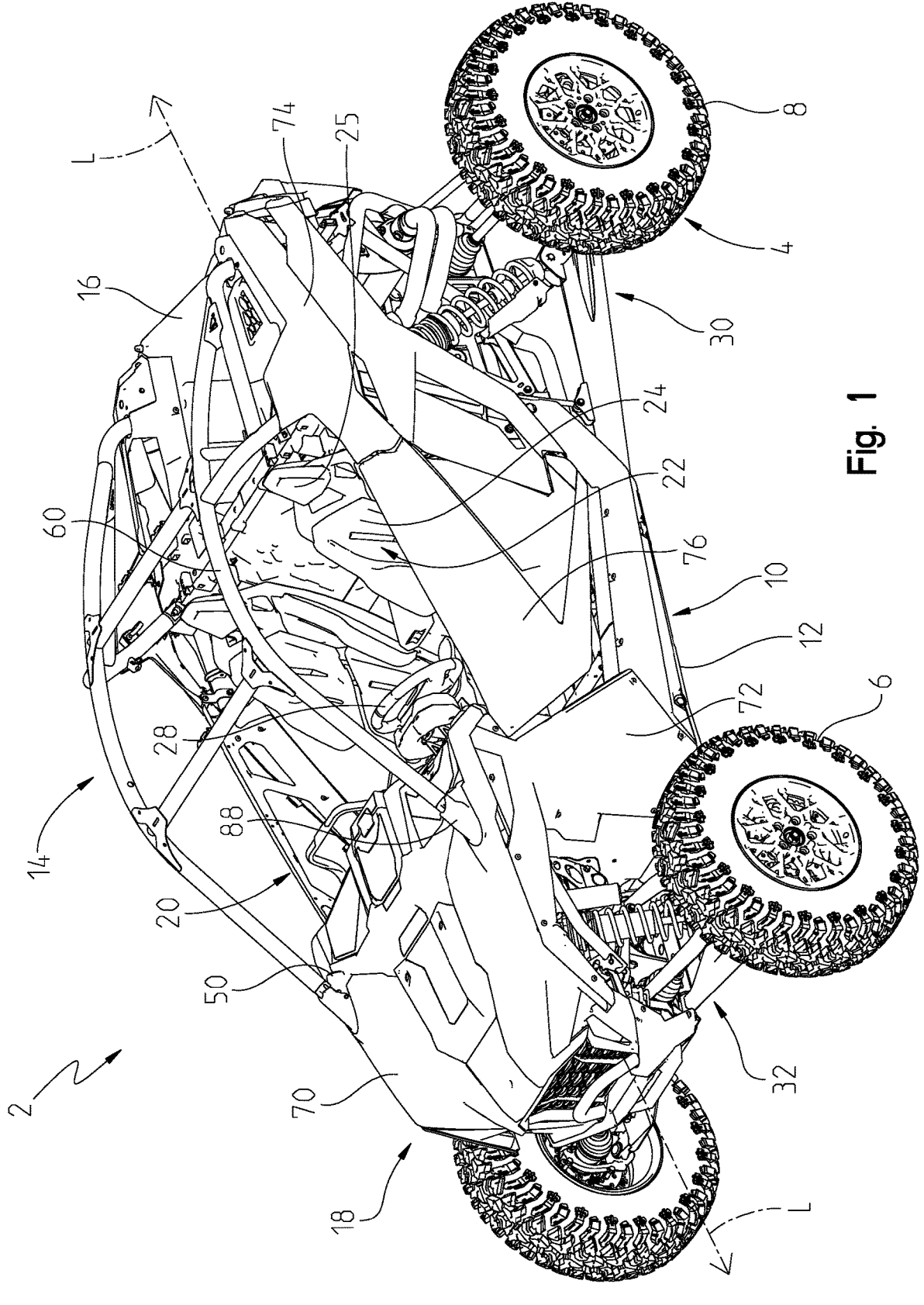
FIG. 1 is a front left perspective view of a utility vehicle of the present disclosure.
Figure 2:
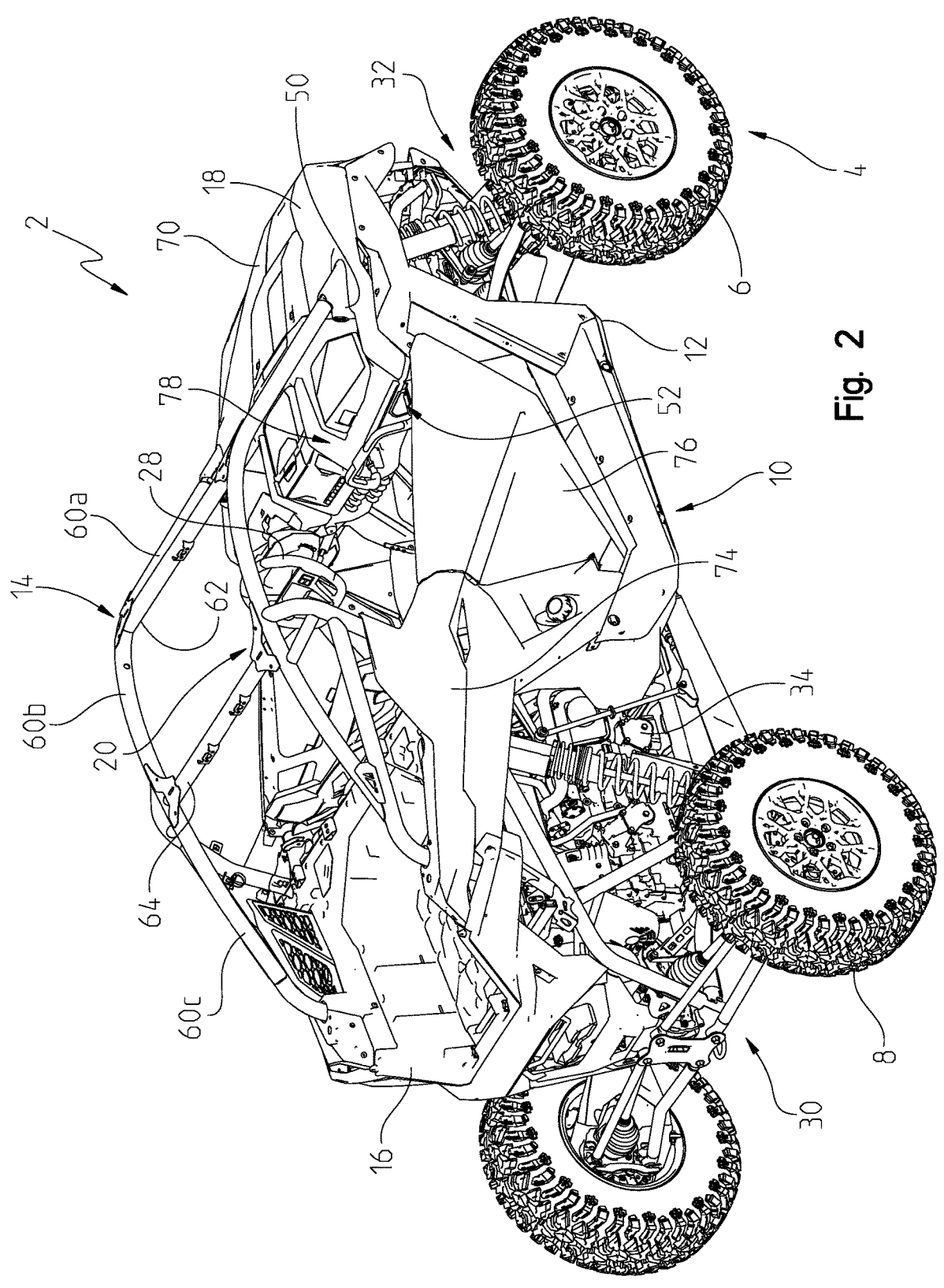
FIG. 2 is a rear right perspective view of the vehicle of FIG. 1.

Vehicle 2 further includes a frame assembly 10 supported by ground-engaging members 4, which extends along a longitudinal axis L of vehicle 2 (FIG. 1). Additionally, in one embodiment, frame assembly 10 may include a lower frame assembly 12 and an upper frame assembly 14 extending vertically above lower frame assembly 12; however, alternative embodiments of vehicle 2 may not include upper frame assembly 14. At least lower frame assembly 12 supports a rear cargo area 16 and a vehicle body 18, which includes a plurality of body panels.

In one embodiment, upper frame assembly 14 includes a plurality of frame members removably or permanently coupled together. As used herein, "coupled," "couples," "coupling," or any variation thereof defines a permanent joining (e.g., welding) or a temporary or removable joining (e.g., bolts, nuts, screws, etc.). As shown in FIGS. 1-7, upper frame assembly 14 includes longitudinally-extending members 60 configured to extend from a front portion of vehicle 2 adjacent an operator area 20 to a rear portion of vehicle 2 adjacent rear cargo area 16. Longitudinally-extending members 60 including a forward portion 60*a* positioned generally forward of seating 22 in operator area 20, an intermediate portion 60*b* positioned generally above seating 22, and a rearward portion 60*c* positioned generally rearward of seating 22. Additionally, upper frame assembly 14 includes at least one cross-member and, illustratively includes a forward cross-member 62 and a rearward cross-member 64, each of which are coupled to longitudinally-extending members 60.

Referring still to FIGS. 1-7, vehicle body 18 includes various body panels supported along longitudinal axis L of vehicle 2. More particularly, vehicle body 18 includes a hood assembly 70, front side panels or fenders 72, rear side panels or fenders 74, doors 76, and a dashboard assembly 78. As shown best in FIGS. 9 and 10, dashboard assembly 78 may include an upper dash portion 80 and a lower dash portion 82. Upper and lower dash portions 80, 82 may be removably or permanently coupled to each other and are configured to support various components of vehicle 2, such as a gauge or display 84, a plurality of inputs 86, a steering wheel 28, and others. Various operator inputs or controls may be further described in U.S. patent application Ser. No. 16/244,462, filed Jan. 10, 2019, and entitled "VEHICLE" and U.S. Provisional Patent Application Ser. No. 62/840,654, filed Apr. 30, 2019, and entitled "VEHICLE", the complete disclosures of which are expressly incorporated by reference herein.

Vehicle 2 also includes an open-air operator area 20 which, illustratively, includes seating 22 for one or more passengers. As such, operator area 20 is exposed to ambient air and may not be fully enclosed. Alternatively, vehicle 2 may include a cab assembly (not shown), such as a roof, front windshield, rear windshield, doors, or any combination thereof to enclose operator area 20. Upper frame assembly 14 may be positioned generally around operator area 20 such that seating 22 is at least partially surrounded by upper frame assembly 14. Illustratively, seating 22 includes an operator seat and a passenger seat, however, seating 22 may also include rear seats for additional passengers or may include only a single seat for carrying the operator. Seating 22 may include a seat back 24 having a head rest 25 (FIG. 1) and a seat bottom 26.

Referring still to FIGS. 1-7, vehicle 2 includes a rear suspension assembly 30 and a front suspension assembly 32, both supported by lower frame assembly 12. Additional details of rear and front suspension assemblies 30, 32 may be disclosed in U.S. patent application Ser. No. 16/226,797, filed Dec. 20, 2018, and entitled "REAR SUSPENSION ASSEMBLY FOR A VEHICLE", the complete disclosure of which is expressly incorporated by reference herein.

Referring to FIG., vehicle 2 further includes a powertrain assembly 34 which is supported by lower frame assembly 12 and includes at least a prime mover, illustratively an engine 36, a geartrain which may be configured as a shiftable transmission (not explicitly shown), and a continuously variable transmission ("CVT") 38. Engine 36 is positioned rearward of operator area 20. While the prime mover is disclosed as engine 36, the prime mover may be any type of device configured to provide power to vehicle 2, such as an electric motor, a fuel-based engine, a hybrid engine, a generator, etc. In one embodiment, CVT 38 also is positioned at least partially rearward of operator area 20. CVT 38 may be positioned laterally outward from or to the side of engine 36 in a direction generally perpendicular to a longitudinal axis L of vehicle 2 (FIG. 1) to extend generally parallel to longitudinal axis L. However, CVT 38 also may extend in a generally perpendicular direction relative to longitudinal axis L or may be configured in any orientation relative to longitudinal axis L, engine 36, and the geartrain. For example, in one embodiment, CVT 38 may be positioned longitudinally forward of engine 36 and configured to extend laterally in a direction generally perpendicular to longitudinal axis L.

Figure 8:
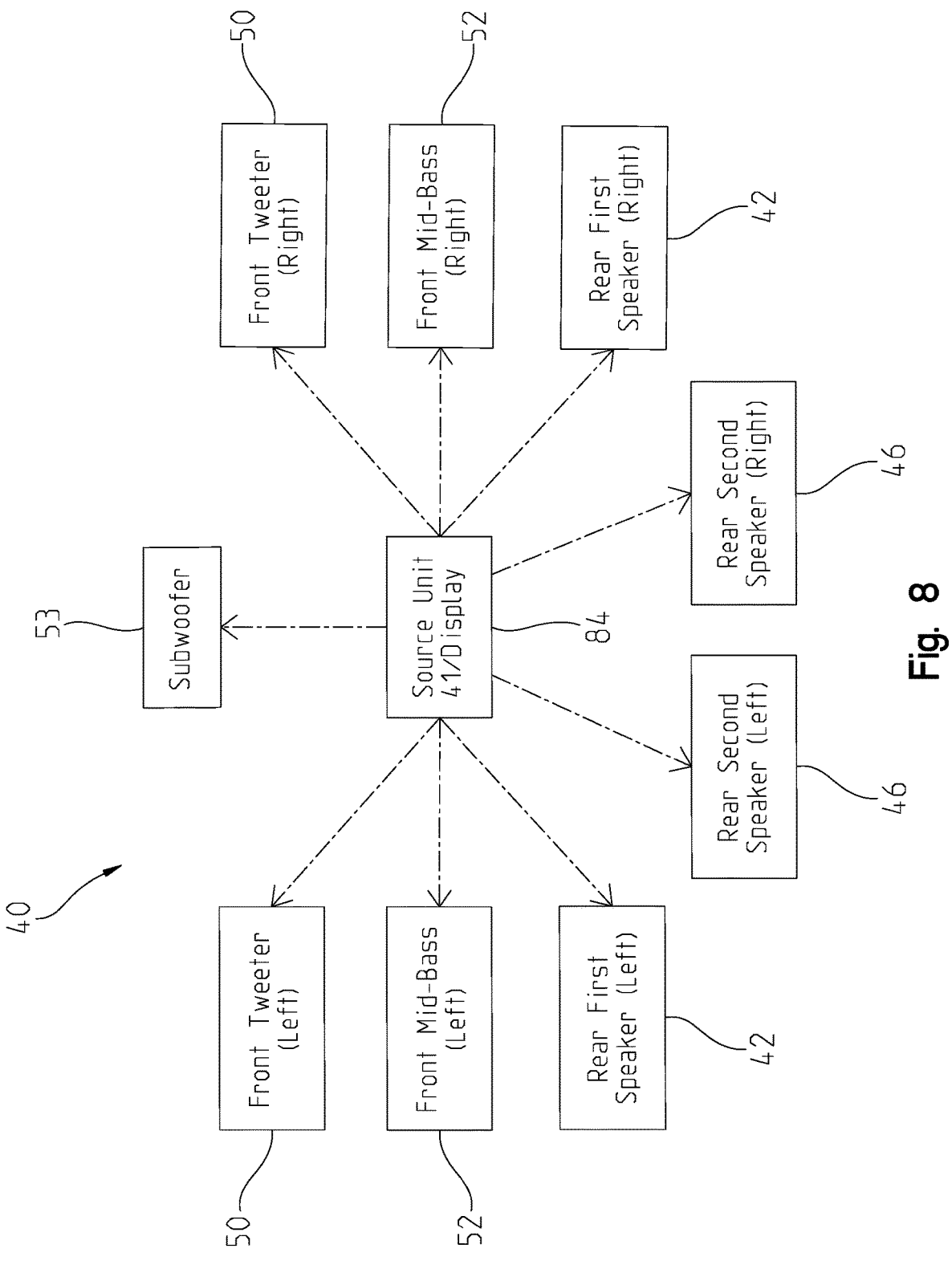
FIG. 8 is a diagrammatic view of an audio system of the vehicle of FIG. 1.

Referring to FIGS. 8-14, vehicle 2 further includes an audio system or assembly 40 configured to project sound into and within operator area 20. In various embodiments, audio system 40 is configured to project music, phone calls or other commands from a cellular phone (e.g., via Bluetooth connectivity), communications between connected vehicles, commands or operating conditions of vehicle 2 (e.g., via connectivity with display 84), etc. into operator area 20 and towards at least the operator. As shown in FIG. 8, audio system 40 includes at least one speaker and, illustratively, includes first rear speakers 42, second rear speakers 46, front speaker sets comprising front tweeters 50 and front mid-bass speakers 52, and a speaker woofer or subwoofer 53. Audio system 40 is configured to receive an input from a source unit 41 (e.g., a music command, a Bluetooth command, a cellular command, a wired command via USB, etc.) to output sound. Source unit 41 is in communication or integrated with display 84 such that the operator or passenger can selectively input a command to initiate the sound output. Once audio system 40 is engaged, at least one signal is transmitted to output sound through any or all of speakers 42, 46, 50, 52 and/or subwoofer(s) 53. It may be appreciated that various embodiments of audio system 40 may not include all of speakers 42, 46, 50, 52 and/or subwoofer 53. Additional details of audio system 40, display 84, source unit 41, and/or operation of Bluetooth commands, intervehicle communications, cellular commands and integration, and others may be disclosed in U.S. patent application Ser. No. 16/234,1692, filed Dec. 27, 2018, and entitled "RECREATIONAL VEHICLE INTERACTIVE TELEMETRY, MAPPING, AND TRIP PLANNING"; U.S. Pat. No. 10,154,377, filed Sep. 12, 2016, and entitled "VEHICLE TO VEHICLE COMMUNICATIONS DEVICE AND METHODS FROM RECREATIONAL VEHICLES"; U.S. patent application Ser. No. 15/161,720, filed May 23, 2016, and entitled "DISPLAY SYSTEMS AND METHODS FOR A RECREATIONAL VEHICLE"; U.S. patent application Ser. No. 16/043,514, filed Jul. 24, 2018, and entitled "RECREATIONAL VEHICLE GROUP MANAGEMENT SYSTEMS"; and U.S. Provisional Patent Application Ser. No. 62/783,601, filed Dec. 21, 2018, and entitled "SYSTEMS AND METHODS FOR CONNECTING ACCESSORIES TO RECREATIONAL VEHICLES", the complete disclosures of which are expressly incorporated by reference herein.

Figure 9:
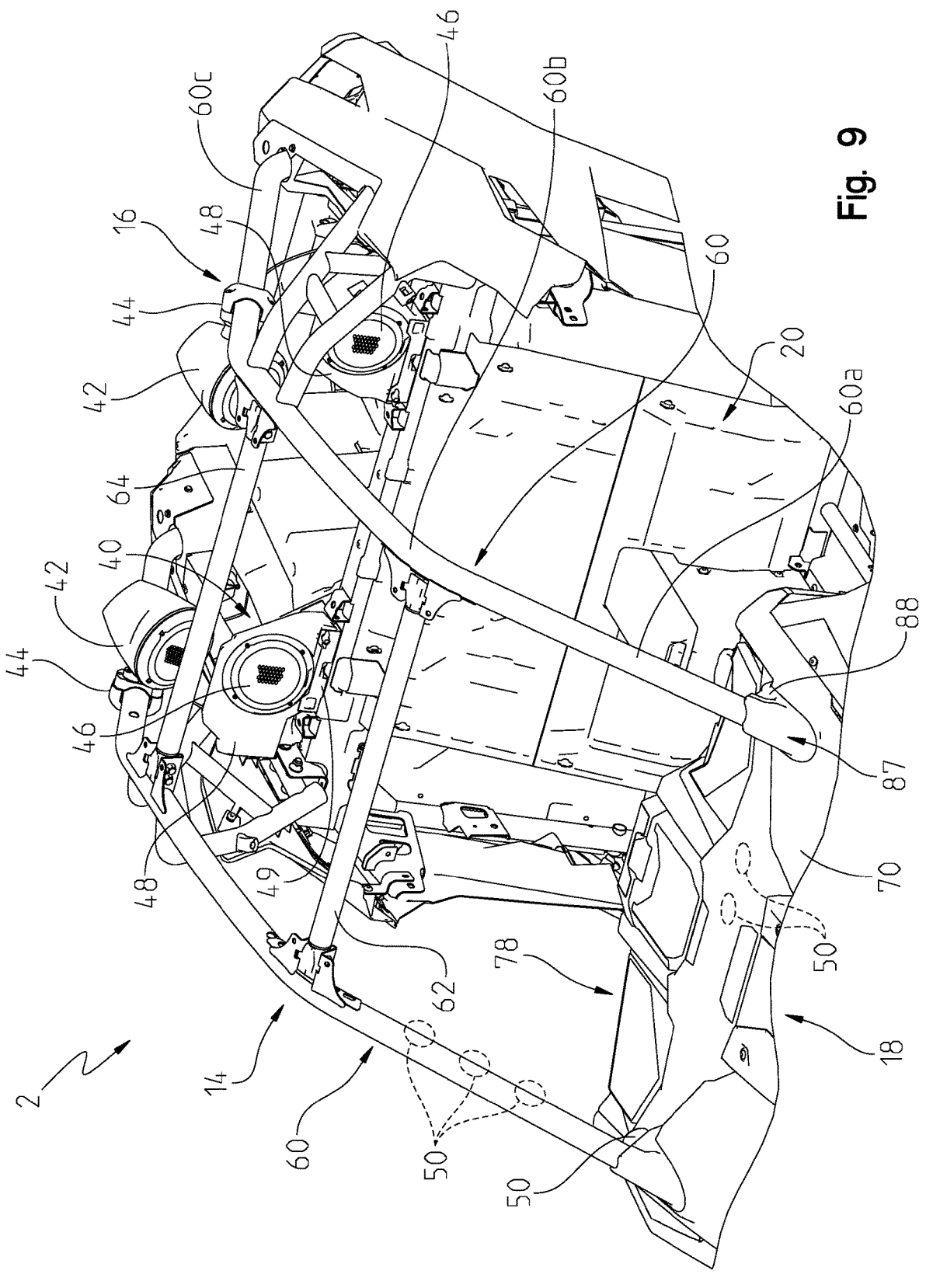
FIG. 9 is a front left perspective view of an operator area of the vehicle of FIG. 1 including the audio system of FIG. 8 having at least one speaker positioned generally rearward of an operator.

Referring to FIG. 9, first and second rear speakers 42, 46 are generally positioned rearwardly of operator area 20 and rearwardly of the operator's and/or passenger's head. In one embodiment, at least second rear speakers 46 are defined as coaxial speakers. First rear speakers 42 are supported by a portion of upper frame assembly 14 and, specifically, may be supported on longitudinally-extending members 60. Illustratively, first rear speakers 42 are removably coupled to rearward portion 60c of longitudinally-extending members 60 with clamps or couplers 44. Clamps 44 may hingedly enclose a portion of rearward portion 60c of longitudinally-extending members 60 to allow easy attachment and removal of first rear speakers 42 to vehicle 2. When attached to longitudinally-extending members 60, first rear speakers 42 may be positioned above a forward portion of rear cargo area 16 and adjacent second rear speakers 46 and head rests 25.

Referring still to FIG. 9, second rear speakers 46 are illustratively positioned below a portion first rear speakers 42 and are supported by lower frame assembly 12, upper frame assembly 14, and/or rear cargo area 16. In one embodiment, second rear speakers 46 are integrated into a body panel or other portion of rear cargo area 16. In one embodiment, second rear speakers 46 include a mounting plate 48 which removably couple to a bracket or mount 49 on frame assembly 10.

As shown in FIG. 9, first and second rear speakers 42, 46 may be positioned on both the right and left sides of vehicle 2 and are directed towards operator area 20. It may be apparent that first and second rear speakers 42, 46 are positioned generally adjacent and/or above head rest 25 (FIG. 1) of seating 22 and above at least a portion of doors 76. In this way, speakers 42, 46 face the operator and are configured to direct sound towards the head of the operator and/or the passenger to improve the sound quality heard by the operator and/or passenger. Additionally, the projection of the sound from speakers 42, 46 is not impeded or redirected by any panels or other components of vehicle 2, thereby, again, allowing enhanced sound quality to be heard within operator area 20. Because vehicle 2 may be an open-air vehicle with an open-air operator area 20, first and second rear speakers 42, 46 are positioned to direct sound at the operator's head without any hinderance to the sound.

Referring now to FIGS. 10-14, audio system 40 further includes front speaker sets, comprised of front tweeters 50 and front mid-bass speakers 52, and subwoofer 53. Subwoofer 53 may be positioned on lower dash portion 82 and, more particularly, may be positioned adjacent a storage compartment (e.g., a glove compartment) 83. Illustratively, subwoofer 53 are positioned below glove compartment 83. Subwoofer 53 faces rearwardly to direct sound towards the operator.

Figure 5:
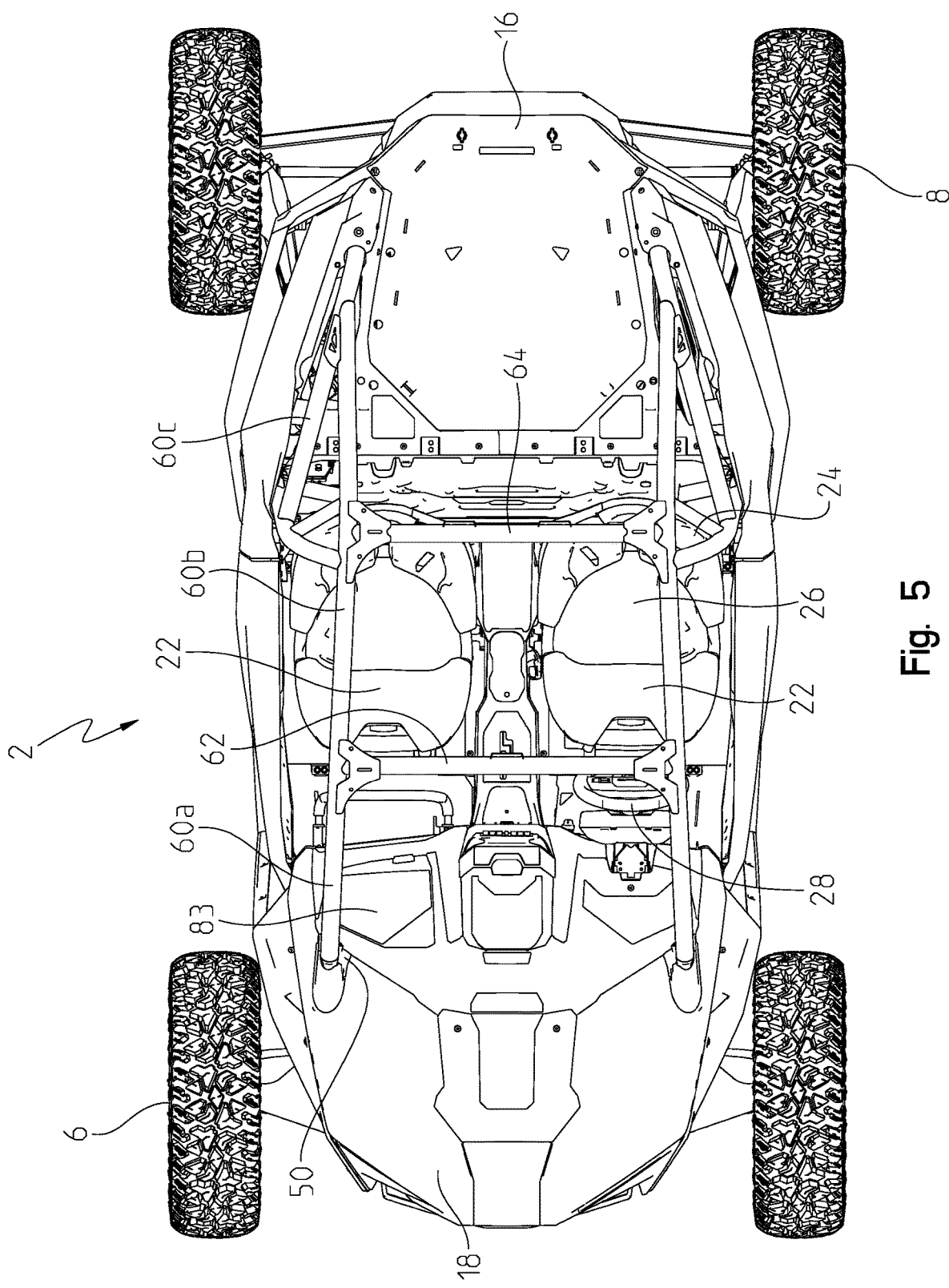
FIG. 5 is a top view of the vehicle of FIG. 1.
Figure 6:
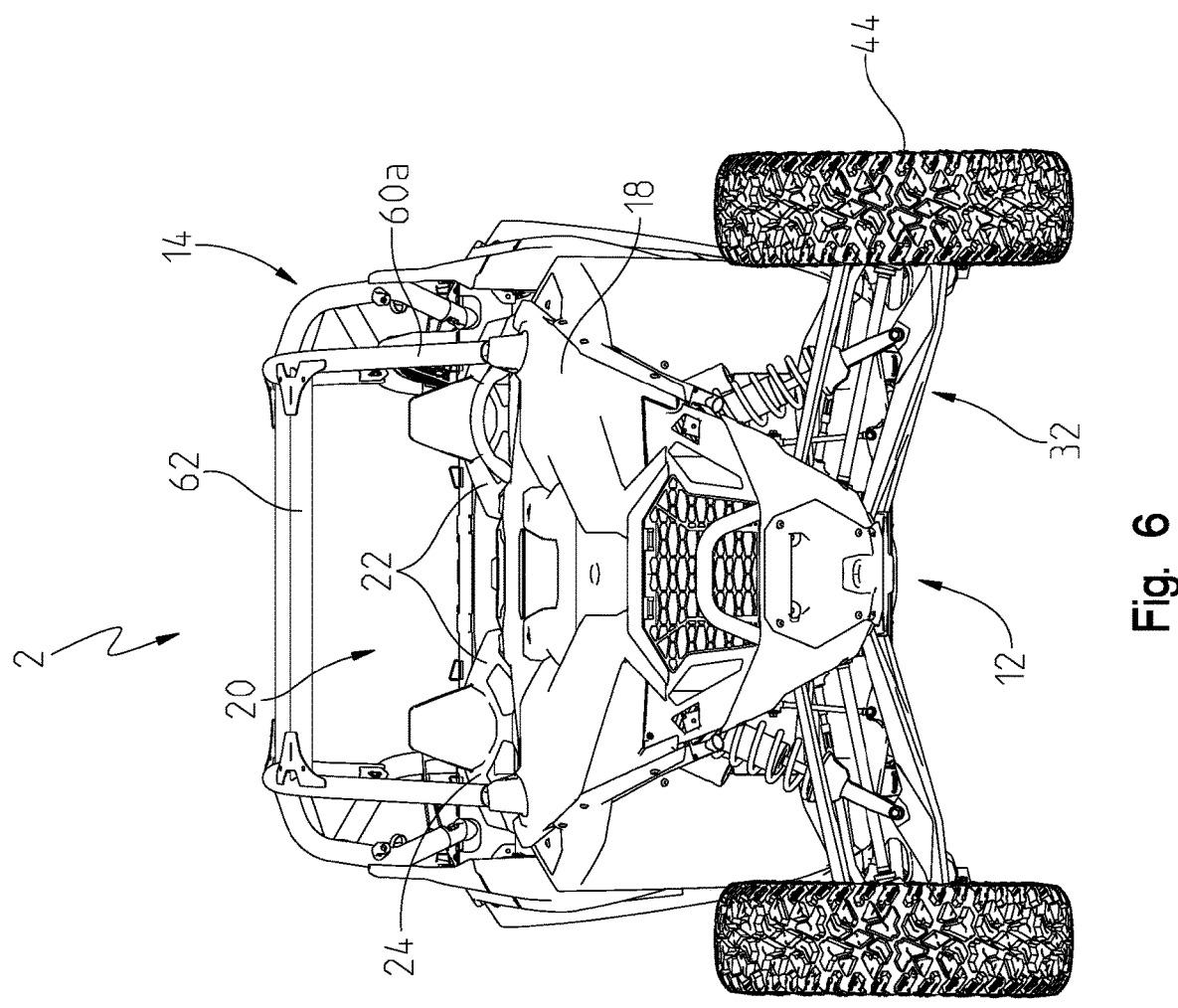
FIG. 6 is a front view of the vehicle of FIG. 1.
Figure 7:
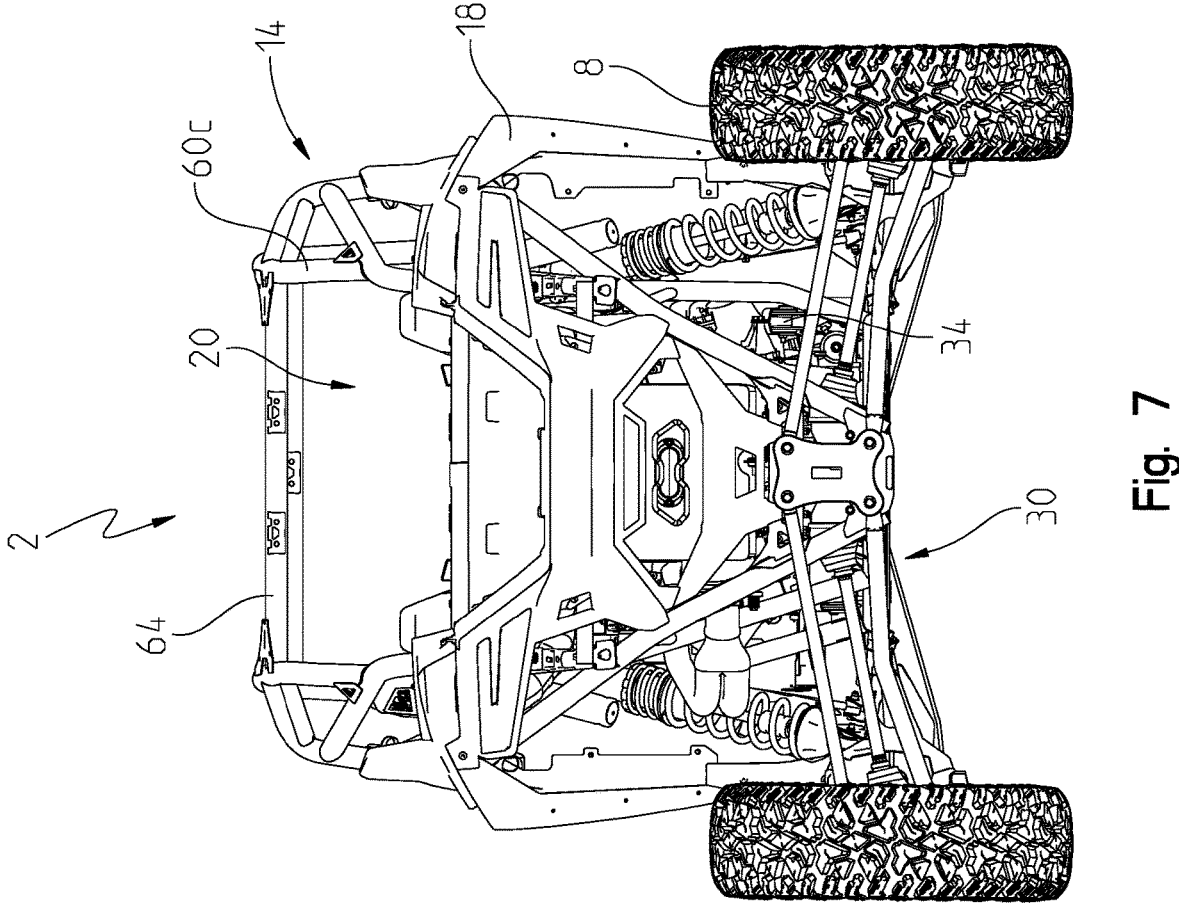
FIG. 7 is a rear view of the vehicle of FIG. 1.

Front speakers 50, 52 are positioned generally forward of seating 22 (FIG. 1) and are supported on or adjacent to dashboard assembly 78. More particularly, speakers 52 are positioned within lower dash portion 82 and face in a rearward direction towards seating 22. Speakers 52 are spaced apart from doors 76 such that any sound emanating from speakers 52 is not impeded or redirected by panels on doors 76. In one embodiment, speaker 52 along the left side of vehicle 2 is positioned generally adjacent a portion of steering wheel 28 (FIG. 1) and speaker 52 along the right side of vehicle 2 is positioned generally adjacent glove compartment 83 of dashboard assembly 78. In this way, speakers 52 are positioned away from door 76 and above the floor of vehicle 2 to better direct sound towards the operator and passenger. Further, at least a portion of speakers 52 is positioned at a vertical height greater than that of seat bottom 26 (FIG. 5).

Front tweeters 50 also area positioned away from door 76 and above the floor of vehicle 2. Additionally, front tweeters 50 are positioned at a vertical height greater than that of at least seat bottom 26 (FIG. 5). In this way, like speakers 52, front tweeters 50 also direct sound rearwardly into operator area 20 such that sound is not redirected off of a body panel or other component of vehicle 2. Therefore, front tweeters 50 and speakers 52 enhance the sound quality experienced by the operator and/or the front passenger.

With reference still to FIGS. 10-14, front tweeters 50 are positioned above a portion of dashboard assembly 78 and, specifically, above an upper extent of upper dash portion 80. Additionally, front tweeters 50 are positioned adjacent forward portion 60a of longitudinally-extending members 60 of upper frame assembly 14. Illustratively, tweeters 50 are positioned rearward of a coupling location 87 between forward portion 60a and lower frame assembly 12 and also are positioned above at least a portion of steering wheel 28. Further, tweeters 50 also are positioned above a majority of seating 22 and, more specifically, are positioned above seat bottom 26 and are generally aligned with head rest 25 of seat back 24.

Figure 10:
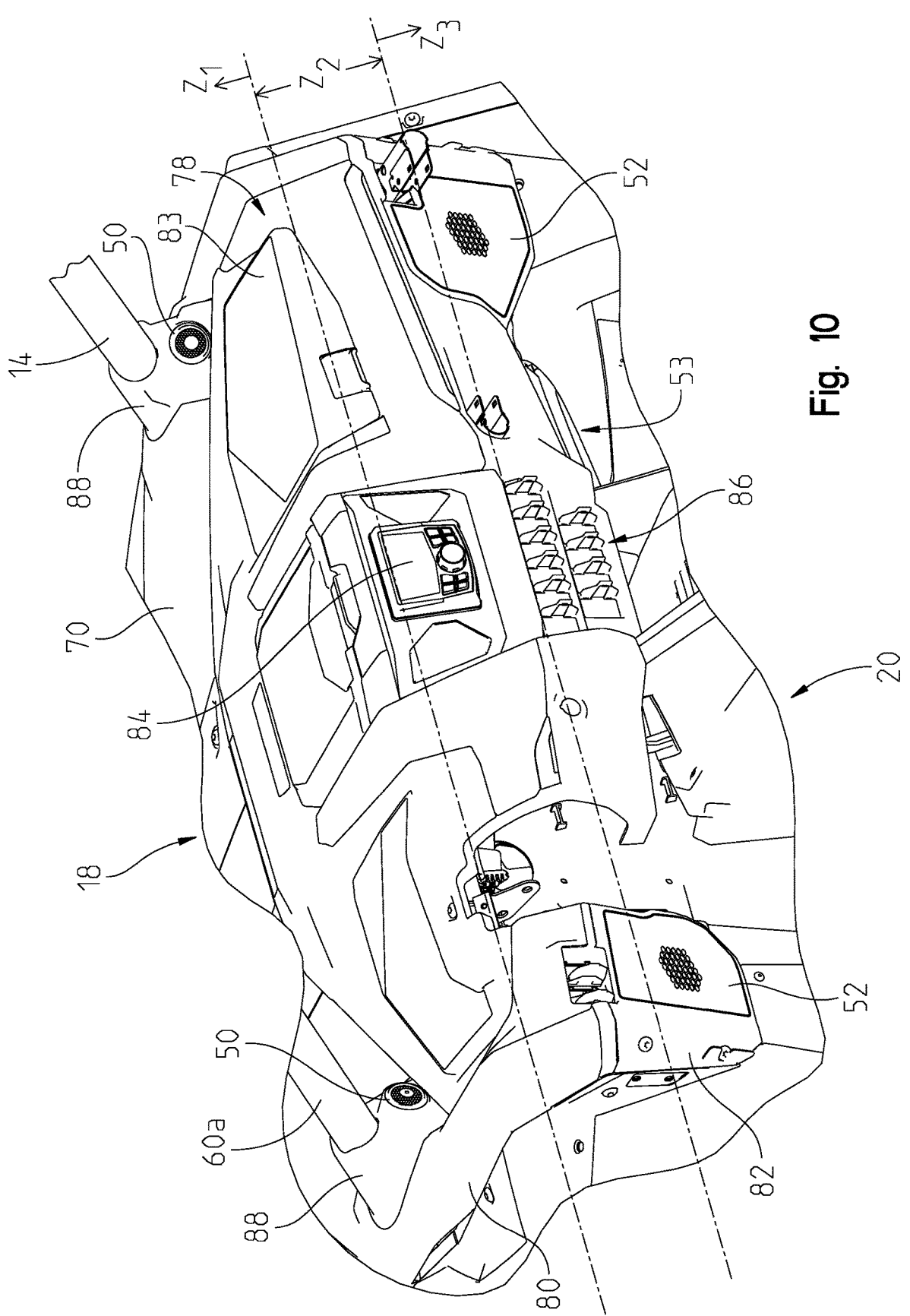
FIG. 10 is a rear left perspective view of the operator area of FIG. 9 which is configured to support additional components of the audio system of FIG. 8
Figure 11:
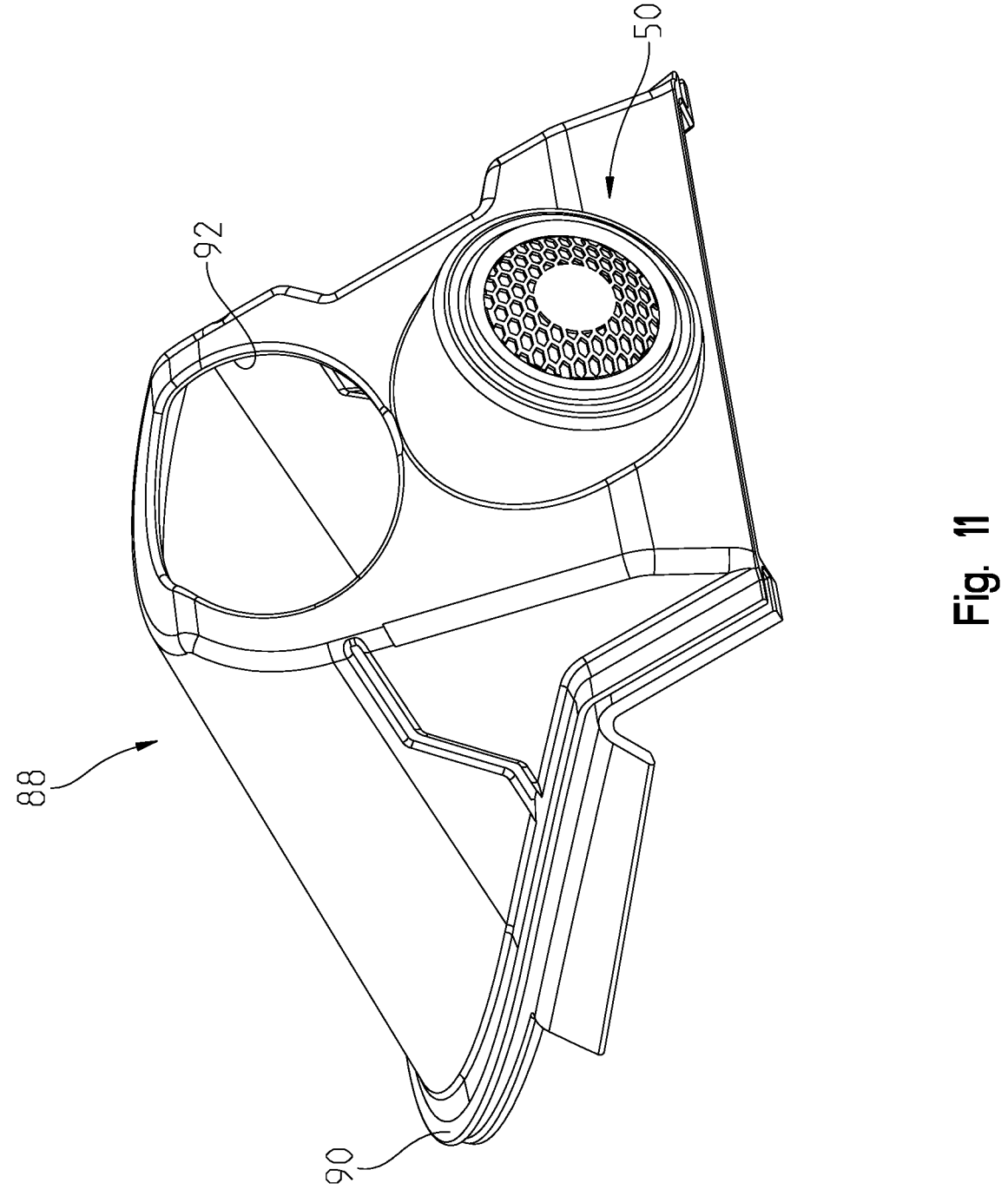
FIG. 11 is a rear left perspective view of a body panel or enclosure configured to support a speaker of the audio system of FIG. 10.
Figure 12:
FIG. 12 is an exploded view of the enclosure and the speaker of FIG. 11.
Figure 13:
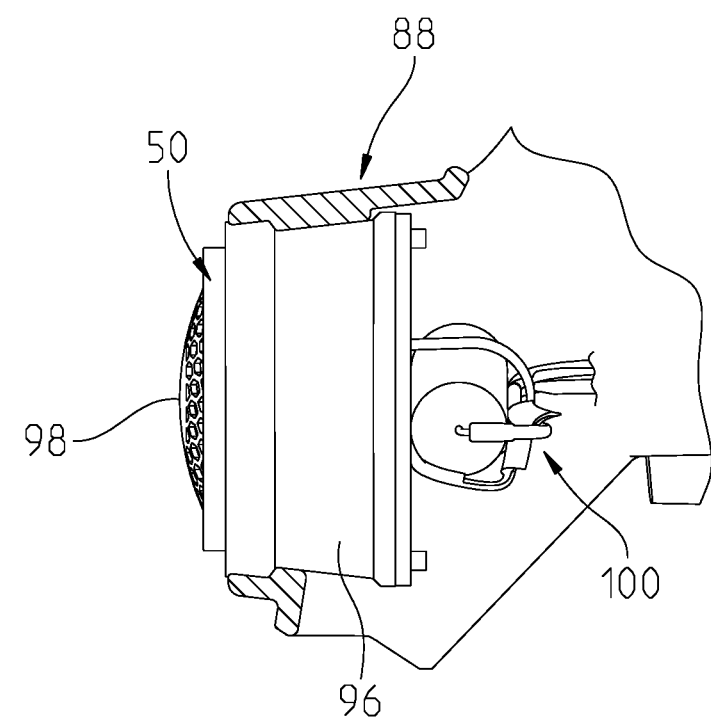
FIG. 13 is a cross-sectional view of the enclosure and the speaker of FIG. 11.
Figure 14:
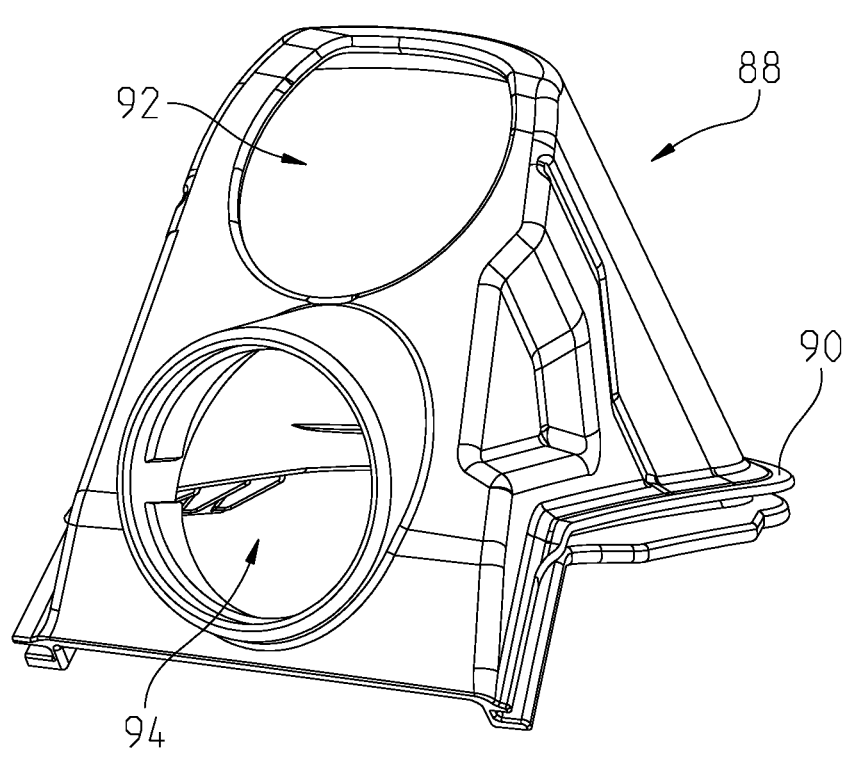
FIG. 14 is a rear right perspective view of the enclosure with the speaker removed.

Alternatively, as shown in FIG. 9, tweeters 50 also may be positioned along the length longitudinally-extending members 60 or may be positioned along or within the upper surface of dashboard assembly 78. If tweeters 50 are positioned along the length of longitudinally-extending members 60 and/or at the upper surface of dashboard assembly 78, tweeters 50 still face rearwardly (as shown in FIG. 10) towards operator area 20 to direct sound towards the operator's head/ears. It may be apparent that that various positions of tweeters 50 shown in FIG. 9 are positioned at or above the upper surface of dashboard assembly of an off-road vehicle and direct sound towards an operator's head for enhanced sound quality within the open-air operator area 20.

An enclosure 88 of vehicle body 18 is coupled to upper dash portion 80 and scaled thereto with a seal 90. Enclosure 88 is configured to conceal the connection of upper frame assembly 14 to lower frame assembly 12 at the lower end of forward portion 60a (shown as connection or coupling location 87 in FIG. 9). More particularly, upper frame assembly 14 is configured to couple (e.g., via welds or bolts) with lower frame assembly 12 at the lower ends of at least forward portion 60a and rearward portion 60c of longitudinally-extending members 60. This connection location or joint of forward portion 60a and lower frame assembly 12 is shown at 87 in at least FIG. 9. As such, a visible joint may be created at the lower ends of portions 60a, 60c which affect the aesthetics of vehicle 2.

Coupling location 87 between upper frame assembly 14 and lower frame assembly 12 at forward portion 60a also provides available space on vehicle 2 for additional speakers of audio system 40, such as tweeters 50. This location also allows tweeters 50 to face rearwardly and direct sound into operator area 20 without the sound being redirected by other panels or surfaces of vehicle 2. In this way, tweeters 50 positioned adjacent the lower end of forward portion 60a are spaced apart from lower, more enclosed areas of operator area 20 (such as a kick panel or a lower portion of door 76) which could negatively impact the direction and quality of the sound output by tweeters 50.

Referring still to FIGS. 9-14, enclosure 88 may be comprised as a rubber boot or enclosure. In some embodiments, enclosure 88 may be comprised of the same material and color as hood assembly 70 or front side panels 72 such that enclosure 88 aesthetically matches other portions of vehicle body 18. Alternatively, if the design of vehicle 2 dictates that enclosure 88 should be a different color and/or material than other portions of vehicle body 18 (e.g., the same material and/or color as longitudinally-extending member 60), such options are available because enclosure 88 is separable from hood assembly 70, front side panel 72, and dashboard assembly 78.

It may be appreciated that enclosure 88 is a single component of vehicle body 18 that is configured to support a portion of upper frame assembly 14 (e.g., forward portion 60a of longitudinally-extending members 60), support a portion of audio system 40 (e.g., front tweeter 50), seal with hood assembly 70, front side panel 72, and/or dashboard assembly 78 to prevent fluids or dirt and debris from entering vehicle 2 at that location, and conceal the joint or connection between forward portion 60a of longitudinally-extending member 60 and lower frame assembly 12 (i.e., coupling location 87). As shown best in FIGS. 11-14, enclosure 88 includes a first opening 92 configured to receive a portion of forward portion 60a. First opening 92 is positioned above a lower surface of enclosure 88 which allows the body of enclosure 88 to conceal the connection or joining of forward portion 60a to lower frame assembly such that forward portion 60a extends through opening 92 when joined with lower frame assembly 12.

Enclosure 88 also includes a second opening 94 (FIG. 14) configured to receive front tweeter 50. In one embodiment, second opening 94 is positioned below first opening 92 such that forward portion 60a extends over and above tweeter 50. This vertical alignment of openings 92, 94 also allows for a compact configuration of enclosure 88. When tweeter 50 is received within opening 94 and supported on enclosure 88, a speaker body 96 is concealed within enclosure 88 such that only a speaker mesh 98 is visible within operator area 20. Additionally, electrical components 100 of tweeter 50 (e.g., wiring) extend through opening 94 and also are concealed by enclosure 88. In this way, enclosure 88 allows for tweeters 50 to be positioned for enhanced sound quality within operator area 20 and also conceals the joining of forward portion 60a and lower frame assembly 12 in the same general location of tweeter 50.

Figure 3:
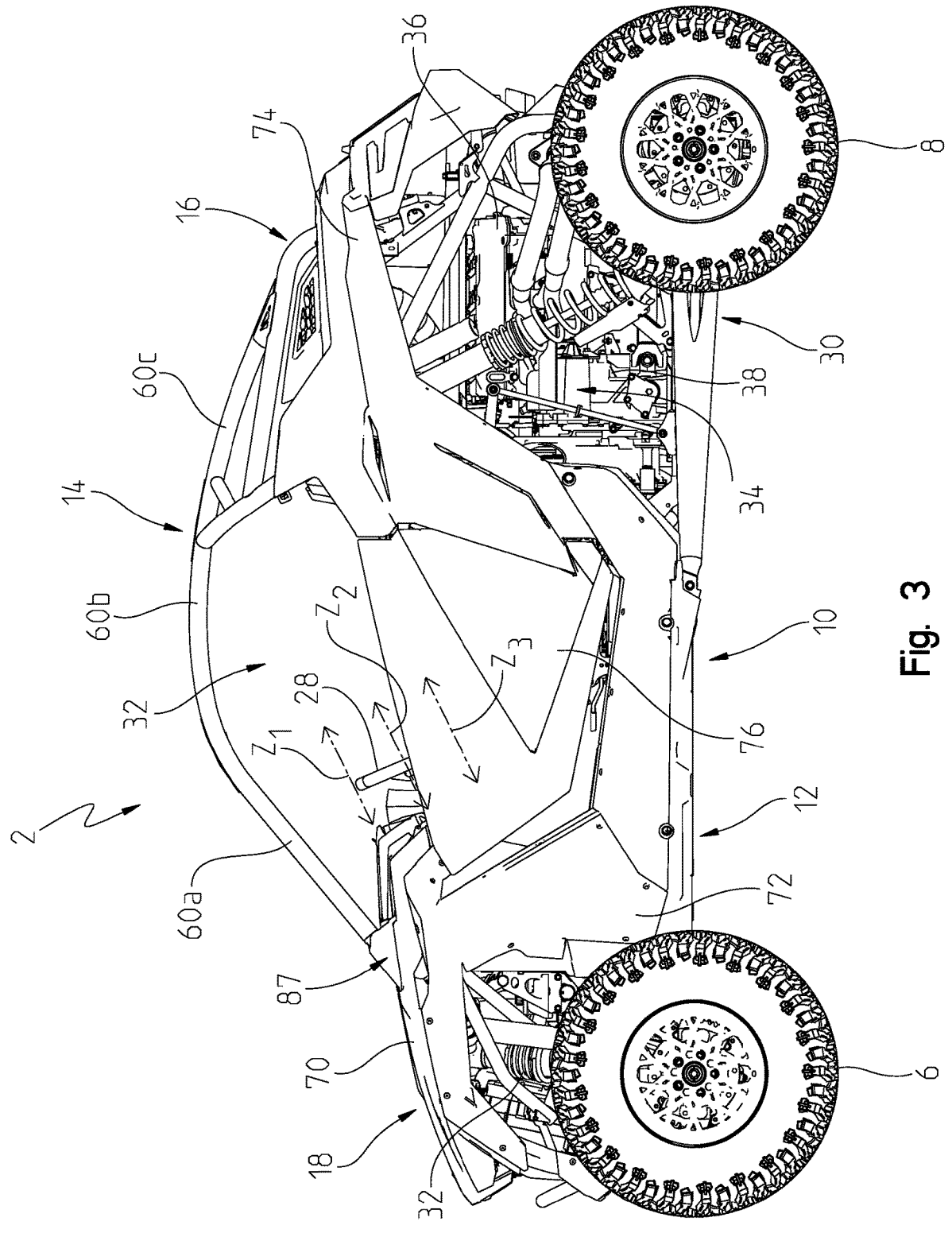
FIG. 3 is a left side view of the vehicle of FIG. 1.
Figure 4:
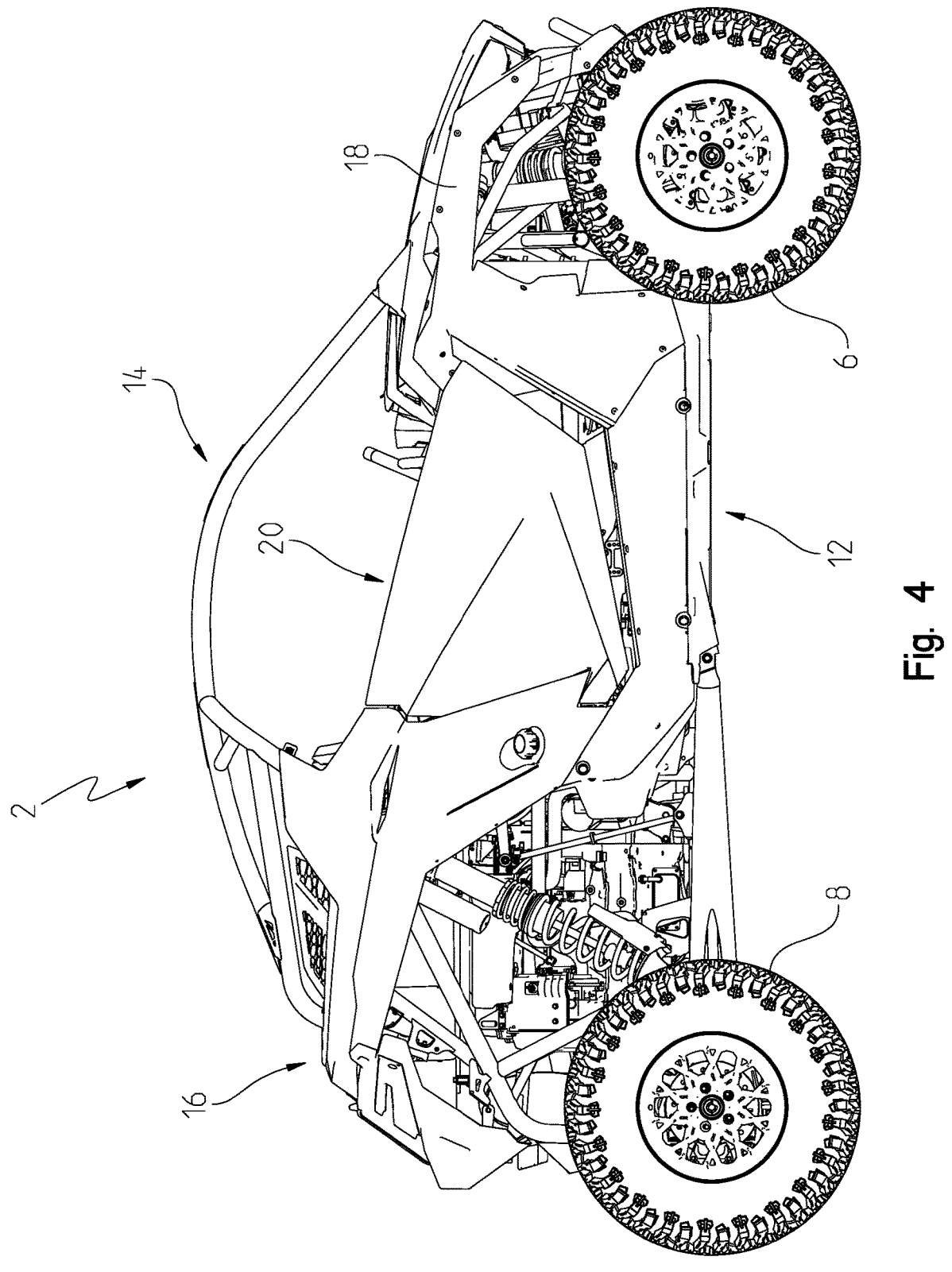
FIG. 4 is a right side view of the vehicle of FIG. 1.

Referring to FIGS. 3 and 10, because vehicle 2 may be an open-air vehicle, audio system 40 is configured to directly project sound towards the operator. In order to accomplish this, various speakers and components of audio system 40 are positioned to best direct sound towards the operator's head/ears. More particularly, if operator area 20 is divided into three sound zones (where zone 1 is labeled Z1, zone 2 is labeled as Z2 and positioned below zone 1, and zone 3 is labeled as Z3 and positioned below zone 2) as shown in FIGS. 3 and 10, it is apparent that head rest 25 and, therefore, the operator's and passenger's heads are positioned in zone 1. Zone 2 may include the operator's shoulders and is positioned below head rest 25. Zone 3 may include the operator's mid-section or legs and is positioned along the mid-portion of seat back 24. Audio system 40 of the present disclosure is configured to direct sound within zone 1 such that sound is directed at the operator's head/ears. However, additional speakers or components of audio system 40 may also direct sound within zone 2. It may be apparent that zone 3 is away from the operator's head and, therefore, audio system 40 is not configured to direct sound therein. For example, rear speakers 42, 46 and front tweeters 50 may be configured and positioned to direct sound within zone 1 where the operator's head is positioned, thereby allowing multiple speakers to project sound directly towards the operator. Additionally, mid-bass speakers 52 may be configured to project sound within zone 2 for enhanced sound within operator area 20 because speakers 52 also are directly projecting sound towards the operator, rather than being positioned at a location where sound might be obstructed or redirected by other surfaces. As shown and disclosed herein, zones 1 and 2 are positioned above the floor and above at least half of the door in the vertical direction, and as such, audio system 40 is configured for sound to be directed towards the operator's head within at least zone 1.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A recreational vehicle, comprising:
   a plurality of ground engaging members including at least one front ground engaging member and at least one rear ground engaging member;
   a frame supported by the plurality of ground engaging members, the frame extending along a longitudinal centerline and comprising a plurality of frame members;
   an open-air operator area defined by at least one frame member of the plurality of frame members, the at least one frame member comprising a first upstanding frame member, a second upstanding frame member, and a plurality of cross-members extending laterally between the first upstanding member and the second upstanding member, the plurality of cross-members comprising a third frame member extending laterally between the first upstanding frame member and the second upstanding frame member;
   a body comprising a plurality of body panels supported by the frame, the plurality of body panels including a first body panel positioned vertically lower than the third frame member, at least one of the plurality of body panels coupled to the first body panel and configured to support a portion of the frame;

a pair of rear speakers on each side of the longitudinal centerline, each pair of rear speakers including a first rear speaker attached to the frame and a second rear speaker integrated into one of the plurality of body panels;

a speaker received within an opening in the at least one of the plurality of body panels and configured to direct sound toward the open-air operator area;

wherein the speaker is positioned longitudinally forwardly of the third frame member and at least a portion of the speaker is positioned laterally intermediate each of the first upstanding frame member and the second upstanding frame member.

2. The recreational vehicle of claim 1, further comprising a storage compartment, and the storage compartment comprises a second body panel of the plurality of body panels, and the speaker is positioned vertically higher than the second body panel.

3. The recreational vehicle of claim 1, wherein the frame extends along a longitudinal centerline and the speaker is angled inwardly toward the longitudinal centerline.

4. The recreational vehicle of claim 1, wherein at least a portion of the first body panel is positioned adjacent the first upstanding member.

5. The recreational vehicle of claim 4, further comprising a second speaker positioned adjacent the second upstanding member.

6. The recreational vehicle of claim 1, wherein the speaker is positioned longitudinally forwardly of the plurality of cross-members.

7. A recreational vehicle, comprising:

a plurality of ground engaging members;

a frame supported by the plurality of ground engaging members;

a longitudinal centerline extending along the frame;

a body comprising a plurality of body panels supported by the frame, the plurality of body panels comprising:

a first body panel positioned on a first side of the longitudinal centerline; and a second body panel positioned on the first side of the longitudinal centerline, the second body panel at least partially defining a storage compartment, the second body panel facing generally upwardly and defining a rearward extent and a laterally inward extent, at least one of the plurality of body panels coupled to the first body panel and configured to support a portion of the frame;

a pair of rear speakers on each side of the longitudinal centerline, each pair of rear speakers including a first rear speaker attached to the frame and a second rear speaker integrated into one of the plurality of body panels; and a speaker received within an opening in and supported by the at least one of the plurality of body panels;

wherein the speaker is positioned longitudinally forward of the rearward extent of the second body panel and laterally outward of the laterally inward extent of the second body panel relative to the longitudinal centerline.

8. The recreational vehicle of claim 7, wherein the speaker is positioned vertically higher than the second body panel.

9. The recreational vehicle of claim 7, further comprising a steering input positioned on a second side of the longitudinal centerline opposite the first side, and the steering input operably coupled to at least one ground engaging member of the plurality of ground engaging members, the steering input rotatable about a rotational axis, and a second speaker is positioned laterally outwardly from the rotational axis relative to the longitudinal centerline.

10. The recreational vehicle of claim 7, wherein the frame defines a forward portion and a rearward portion, and the rearward portion extends further laterally outwardly from the longitudinal centerline than the speaker.

11. The recreational vehicle of claim 10, wherein the forward portion includes a left forward portion and a right forward portion, and the frame includes a cross-member coupled between the left forward portion and the right forward portion, and the speaker is positioned longitudinally forward of the cross-member.

12. The recreational vehicle of claim 7, wherein the speaker is positioned within the first body panel.

13. A recreational vehicle, comprising:

a plurality of ground engaging members;

a frame supported by the plurality of ground engaging members;

a longitudinal centerline extending along the frame;

a body comprising a plurality of body panels supported by the frame, the plurality of body panels comprising a dashboard assembly comprising an upper dash portion and a lower dash portion, the upper dash portion including a storage compartment, at least one of the plurality of body panels coupled to the upper dash portion and configured to support a portion of the frame;

a pair of rear speakers on each side of the longitudinal centerline, each pair of rear speakers including a first rear speaker attached to the frame and a second rear speaker integrated into one of the plurality of body panels;

a speaker received within an opening in the at least one of the plurality of body panels; and wherein the speaker is positioned vertically higher than the storage compartment.

14. The recreational vehicle of claim 13, wherein the speaker is positioned longitudinally forward of a rearward extent of the storage compartment.

15. The recreational vehicle of claim 13, further comprising a subwoofer supported by the frame, wherein the speaker is positioned vertically higher than the subwoofer.

16. The recreational vehicle of claim 15, wherein the subwoofer is supported by the lower dash portion.

* * * * *